United States Patent
Carroll et al.

(10) Patent No.: US 6,873,991 B2
(45) Date of Patent: Mar. 29, 2005

(54) SYSTEM AND METHOD FOR ORGANIZING INFORMATION

(75) Inventors: David B. Carroll, Glassboro, NJ (US); Cory Hildebrand, Sewell, NJ (US)

(73) Assignee: Matter Associates, L.P., Bala Cynwyd, PA (US)

( * ) Notice: Subject to any disclaimer, the term of this patent is extended or adjusted under 35 U.S.C. 154(b) by 0 days.

(21) Appl. No.: 10/263,384

(22) Filed: Oct. 2, 2002

(65) Prior Publication Data

US 2004/0068513 A1 Apr. 8, 2004

(51) Int. Cl.⁷ .............................................. G08F 17/30
(52) U.S. Cl. ........................................ 707/101; 707/3
(58) Field of Search ...................... 707/1–3, 100–104.1

(56) References Cited

U.S. PATENT DOCUMENTS

| | | | | |
|---|---|---|---|---|
| 5,644,764 A | * | 7/1997 | Johnson et al. | 707/103 R |
| 5,675,784 A | * | 10/1997 | Maxwell et al. | 707/100 |
| 6,286,015 B1 | * | 9/2001 | Govindarajan et al. | 707/201 |
| 6,381,600 B1 | * | 4/2002 | Lau | 707/6 |
| 6,442,522 B1 | | 8/2002 | Carberry et al. | 704/257 |
| 6,687,713 B2 | | 2/2004 | Mattson et al. | 707/104.1 |
| 6,708,186 B1 | * | 3/2004 | Claborn et al. | 707/102 |
| 2002/0083079 A1 | | 6/2002 | Meier et al. | |
| 2003/0110164 A1 | | 6/2003 | Kappell, III et al. | |

FOREIGN PATENT DOCUMENTS

JP  2001034528 A  * 2/2001  ........... G06F/12/00

* cited by examiner

*Primary Examiner*—Jack M Choules
(74) *Attorney, Agent, or Firm*—ReedSmith LLP

(57) ABSTRACT

A system and method for accessing and manipulating, for multiple application types, of information stored in at least one database, in accordance with at least one data key, which information may be displayed or searched on a computer as a display of general information, a display of expense information, a display of personnel information or a display of document information relating to the item and matter is disclosed.

11 Claims, 21 Drawing Sheets

Document Search

Criteria

Enter a keyword or phrase. This will return only an exact match. — 1802

[ insurance ] — 1804     [ Search ] — 1806

Search Results

| Client Name | Matter Name | Redwell # | Manila # | Manila Name |
|---|---|---|---|---|
| Elastochem, Inc. | Potential Claims | 1 | 2 | Arkwright Mutual Insurance Company |
| Berwind Corporation | Admin - Insurance Ma.. | 1 | 5 | Commercial GL Insurance Policy - 99-00 |
| Summit Manufacturing, L.. | General Corporate | 1 | 2 | Insurance - Pre-Acquisition |
| Summit Manufacturing, L.. | General Corporate | 1 | 3 | Insurance - Post-Acquisition |
| BNRC | General Representation | 1 | 5 | Mining Insurance Issues |
| Classic Kitchens, LLC | Bkpcy / Classic Kitch.. | 1 | 9 | Insurance Issues |
| Zymark Corporation | General Representation | 1 | 6 | Zymark's Current Insurance Schedule 2000 |
| Berwind Corporation | General Representation | 2 | 14 | Insurance Issues |
| Berwind Financial Group.. | General Corporate | 2 | 2 | AON/Professional Liability Insurance |
| Interlogix, Inc. | Project Athena | 3 | 6 | Insurance Matters |

1808     1810

SYSTEM AND METHOD FOR ORGANIZING INFORMATION

BACKGROUND OF THE INVENTION

1. Field of the Invention

The invention relates generally to information organization, and, more particularly, to an organization of information for professionals and staff in organizing client, customer, accounting, and/or the like, information.

2. Description of the Background

Professional service providers, such as doctors, lawyers, and accountants, store and retrieve information concerning clients, patients, customers, and accounts. Often, such data is in paper form, and is stored, for example, in large open-well files that may contain multiple documents concerning a client or customer. These large paper files may be stored on shelves, or archived in storerooms on or off-site, for example.

Modern databases may be used to store such information, thereby making retrieval quicker and easier, and thereby utilizing less physical space for storage. In addition, the use of networked interfaces may allow access to such databases by multiple users. Controlled access may be provided to the multiple users by the use of security passwords and permissions, for example, which limit the availability of data to authorized individuals. However, although it is conceptually simple to "store and retrieve" information from a database, the organization of data within the database, and the access to such information, may become a determining factor in how useful the database is and how easily the database can operate to provide information.

For example, in the case of professional service providers, multiple areas of key information may include a client identification number, a matter identification number, a breakdown of billing, accounts due and/or receivable, payments made or expenses incurred, professional services rendered, correspondence, communications, meetings, contacts and other personal and corporate entities associated with the matter or client, as well as important documents and/or information associated with a client or customer. Organizing such a large amount of information may become problematic, in paper or database form. In paper form, such information, if limited in volume, may take the form of a well-stuffed expandable folder. If voluminous, such information may take the form of several expandable folders, with the associated physical access and loss problems. Thus, database entry of such information may be a partial solution, but the user may nonetheless suffer with the need to access multiple databases to manipulate contact, correspondence, finance, and document information concerning a single client.

An additional difficulty may be encountered when information is spread between multiple software applications. For example, basic client information may be in a standard searchable database, such as Microsoft Access, document information may be stored in an application such as Microsoft Word or DocsOpen, and accounting information may be provided in an application such as Quicken or another accounting program. Contact information may be provided in an application, such as Contacts within Microsoft Outlook. The roles of individuals may be provided in an application such as Excel or Contacts, and other specialized information, such as drawing information, may be provided in yet another application. Given this multiple application/database access problem, searching for information may become difficult, and multiple search techniques may be necessary, as each database or application may have a favored method of search, or other interface requirement, specified by differing user interfaces.

If information were available such that separately stored but related data was available in an easily searched, accessed, and manipulated form, then an improved ability to utilize related data would increase the efficiency of a professional attempting to access the information. Therefore, a need exists for a system that provides universal information access relating to a given client, and that can allow for the accessing and manipulation of client identification and characterization information, client billing and accounts receivable, client related documents, records of professional services rendered, correspondence, communications, meeting schedules, contacts, and other personal and corporate entity information associated with a client matter, for example. A need additionally exists for such a universal system to provide a comprehensive technique to allow simple access to information of varying complexity and format via a single, simple to use interface.

SUMMARY OF THE INVENTION

A computer program product of the present invention is embodied on one or more computer-readable storage mediums. The computer program product enables manipulation of data of differing types. The data is stored in at least one data store and has a predetermined inter-relationship with other data also stored in at least one data store. The computer program product includes code for cooperating with at least one user interface to receive user input associated with the stored data. The computer program product includes code for automatically interacting with the at least one data store dependently upon the received user input to enable manipulation of a portion of the stored data of a given data type. The computer program product code automatically identifies at least one other portion of the stored data of a data type distinct from the first data type and that has a given relationship with the portion of data. Also, the computer program product code automatically triggers a predetermined manipulation of the at least one other portion of the stored data dependently upon and associated with the received input. The data types may include a word processor data type, a calendar and scheduler data type, a spreadsheet data type, an accounting data type, and a personnel contacts data type.

The inter-relationship between data types may take the form of a commonality with a data item within one or more of the of a word processor data type, a calendar and scheduler data type, a spreadsheet data type, an accounting data type, and a personnel contacts data type. A graphical user interface displays information organized as general information, expense information, personnel information, and documents.

If the graphical user interface is implemented for a legal office application, for example, then the general information may include a client name and number, a matter name and number, a matter description, and a matter category. The expense information may include invoice date, number, amount, and billing entity, itemized billing description, amount of itemized billing and status of the invoice, wherein a user may perform operations on the invoice by choosing to pay the invoice, edit the invoice, or delete the invoice. The personnel information may include company name, individual person name, role of individual in matter and hosting company.

The computer program product may act to manipulate certain pieces of stored data by copying of a data item, reformatting of a data item, and performing numerical operations on a data item to ease the burden of maintaining data consistently within a client and matter organization.

The computer program product may further serve to categorize input data. For example, in a legal office setting, the categories of client and matter data may be general representation, intellectual property, labor and employment, license agreements, litigation, policies, potential claims, real estate and leasing, securities, supply agreements, and taxes.

The invention may be utilized as part of a method of accessing information stored in an item and matter context, in one or more databases, the method including searching the one or more databases using one or more of an item, a matter, an individual and a document. The user then selects one search result from a list of hits associated with the searching, which produces detailed information related to one or more of the item, the matter, the individual and the document. The details may then be presented as an assembly of general information, expense information, personnel information and document information for the selected result. As before, the general information provides an assemblage of the item and the matter information, the expense information provides financial data, the personnel information relates the roles of the individuals to the item and the matter and the document information allows access to relevant documents via the one or more databases. All of this data is available upon a single search.

The invention may generate reports organized as multiple matters across a single client, multiple clients across a category of matters, multiple documents across a single matter, expenses across multiple clients, multiple expenses across a single client, expenses across a single matter, and multiple expenses across a single matter.

Thus, the present invention provides a system that provides universal information access relating to a given client, and that can allow for the accessing and manipulation of client identification and characterization information, client billing and accounts receivable, client related documents, records of professional services rendered, correspondence, communications, meeting schedules, contacts, and other personal and corporate entity information associated with a client matter, for example.

BRIEF DESCRIPTION OF THE DRAWINGS

Understanding of the present invention will be facilitated by consideration of the following detailed description of a preferred embodiment of the present invention, taken in conjunction with the accompanying drawings, in which like numerals refer to like parts and in which:

FIG. 4 is a screen shot of an aspect of the current invention.

FIG. 6 is a screen shot of an aspect of the current invention.

FIG. 18 is a screen shot of an aspect of the current invention.

FIG. 19 is a screen shot of an aspect of the current invention.

FIG. 20 is a screen shot of an aspect of the current invention.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical data access system. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present invention is directed to a method and system for universally inputting, manipulating, and accessing information related to multiple matters, or clients, and/or involving distinct projects or items. The figures incorporated herein serve to provide a detailed exemplary illustration of the method and system of the present invention herein described.

The present invention is an item/matter data integrator, wherein data is organized and formatted by the integrator to allow the user to access, and affirmatively, or passively, manipulate, multiple data types that might otherwise have required the use of multiple distinct data bases and/or multiple distinct applications. The present invention integrates and interrelates information from applications such as, but not limited to, a client/matter generator, a word processor, a calendar/scheduler, a spreadsheet, an accounting program, a contacts directory, a document management function, a searchable relational database, a communications facilitator, a report generation tool, and an import/export tool. The present invention relates numerous occurrences of a data item, such as matters related to the data item, contacts for the item and matter, communications relating to the item and matter, accounting information of the item and matter, documentation relating to the item and matter, and configurable reports of the interrelated data for the item and matter.

Figure 1:
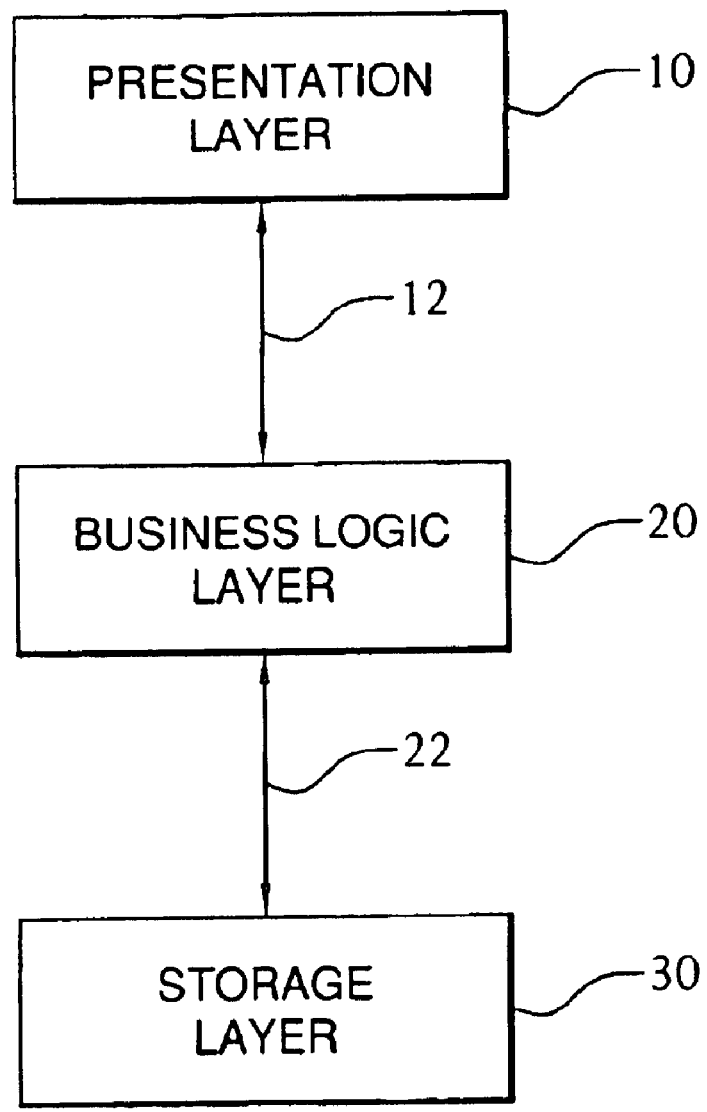
FIG. 1 is a block diagram of the present invention.

Referring now to FIG. 1, there is shown a hierarchical diagram of an integrator according to an aspect of the present invention. The system of FIG. 1 includes at least three layers, namely a presentation layer, a business logic layer, and a database or storage layer.

The presentation layer preferably includes at least one graphical user interface (GUI) that enables the user to access desired information of the data integrator. The presentation layer includes the capabilities to generate suitable integrated data searching and display of data item and client/matter data, related accounting data, related contact, communication, and role data, and documentation and reporting data. The presentation layer preferably provides these capabilities in a uniform manner independent of the data item or matter being searched or displayed, such as by presenting these capabilities in a treed folder format, a split-screen format, a pop-up search window format, a tabbed menu format, a drop-down menu format, a scrollable menu, or the like, for example.

For example, in a law office setting, the following exemplary information might be made available to a user for review and/or manipulation from within the presentation layer: client identification and information; matter identification and information; matter subtopic information; accounting data such as invoice details, accounts receivable, payments received, billing information, billing arrangements; contact information including the roles of clients, opposing parties and supporting counsel as well as other significant individuals such as expert witnesses, friends, and family of the client; documentation information regarding incoming and outgoing documents, including court documents, correspondence between attorneys and clients, and text evidence; and custom constructed reports and standardized default reports useful to clients, attorneys and other authorized users. The presentation layer of FIG. 1 encompasses the functionality of input and output interfaces that connect the user to the item/matter data integrator, such as over a network, such as an intranet, an extranet, the Internet, and/or a wireless network. The presentation layer may be, for example, software or suitable programming resident on at least one computer hard drive or at least one server, and the presentation layer may include a security checkpoint that limits or monitors user activity within the integrator.

The presentation layer 10 may be communicatively connected by an interface, such as an XML (Extensible Markup Language) interface 12, to the business logic layer 20, which in turn may be connected to the storage layer 30 by an interface, such as an XML interface 22. An XML interface permits the creation of custom tags, thereby enabling the definition, transmission, validation, and interpretation of data between applications and functions in the various layers in an object oriented format, for example. An XML interface located between the layers of FIG. 1 may be user and/or application dependent, and thus the schema of the relevant industry may be used. For example, a law firm might use links such as client, matter, and matter type or matter subtopic as object-linking elements, or keys. A rental agency might use links such as address, room number, and tenant. A physician might use links such as patient, illness, and treatment. Thus, the XML interface may be customized to fit the needs of the user, and may provide application dependent links for the objects within the layer that the XML interface is accessing.

The business logic layer 20 of FIG. 1 may include relational logic to execute the XML calls of the presentation layer 10 to provide manipulated data for display to the user. The business logic layer may take the form of suitable computer programming resident on at least one computer hard drive or at least one server. The business logic layer 20 may incorporate, for example, the function or application of a word processor, a calendar/scheduler, a spreadsheet, an accounting program, a personnel contacts directory, a document management function, a searchable relational database, a report generation tool, and an import/export tool, or third party software directed to any one of these types of applications, to provide an integration of the related data for the user interface. The business logic layer may interrelate data, such as by object oriented linking, based on at least one key, for example. This key (or keys) may additionally be linked to the presentation layer, such that, when a request is made in the presentation layer, the key is passed to the business logic layer, the desired data is located and manipulated as set forth further hereinbelow, and the manipulated data may be passed to the presentation layer in accordance with the requested key and manipulation. For example, if all accounting data, documents, communications, and contacts relating to a particular matter are entered, via the presentation layer, with a particular key or keys, such as a particular matter number, the business logic layer will interrelate that data as being correspondent to that matter number, and will process all modifications, updates, payments, or charges to that matter number, thereby maintaining a real time status of the interrelated information for categorical presentation to the user, via the presentation layer, upon request from the user. Simply put, the business logic layer preferably simultaneously, and in real time, manipulates data related to a particular matter that is affected by a requested first manipulation of a data item related to that matter. Further, the business logic may perform in a manner representative of an application intended or desired by the user.

The business logic layer thus provides a bridge between at least two applications, wherein the business logic layer provides data normalization of data input to the presentation layer into the format necessary for manipulation by each of the two applications. In order to provide this bridge, the business logic layer may access required information from the storage layer. Further, the business logic layer, in order to normalize data, includes available data types for the multiple applications accessible to the business logic layer, and includes the manner in which entry of a user request, in conjunction with the availability of a key, such as the client matter number, may require differing normalizations of the incoming data in order to allow for simultaneous interaction with the at least two applications. Thus, the business logic layer understands the type of data incoming from, or to, the presentation layer, and consequently, through the application of predetermined business rules, understands that the data that has been input may be necessary to update multiple applications. Further, the business rules within the business logic layer may allow for launching of an application, and manipulation of the application, and storing of the file created thereby, invisibly to the user, based upon programmed or received instructions within the business logic layer and in accordance with the data normalization performed thereby, and the client/matter key associated therewith. Consequently, the user may input information that may be used to update and/or manipulate multiple applications, whether the user instructed that all of those, or one of those, or none of those applications be updated and/or manipulated.

For example, in an embodiment targeted to an automotive repair business, the matter/item may be a customer/vehicle schema, wherein a customer with multiple vehicles would have multiple items under a single matter, for example. Subtopics of items may include, for example, different subsystems of the automobile in question, such as transmission, engine, or electrical subsystems. A general maintenance category may also be established for standard maintenance items, for example.

The automotive repair embodiment preferably would include a uniform, easily understood and accessible presentation interface 20 that would allow repairmen to access, for example, repair schedules, maintenance schedules, repair histories, contacts or communications related to a given vehicle, perform parts searches, open new matter/items, enter repair notes in document formats, which documents would be corresponded to a matter/item key, etc. A calendar of scheduled maintenance may be established using a date or mileage-triggered queue to request maintenance of the customer's vehicle, such as by comparison of mileage or dates of repairs of a given vehicle to a manufacturer's calendar within the business logic layer 20 communicatively connected to the presentation layer 10, which comparison in the business logic layer may be returned, upon request by the repairmen, to the presentation layer in accordance with the customer/vehicle key entered in the presentation layer, such as in a search mode. An accounting package may maintain records of bills and payments by the keyed customer, as well as any financing offered for larger repairs as recognized by a comparison to a manufacturer's rate chart within the business logic layer, for example. Documentation for the customer may include a listing of the repair requests and work actually performed, and/or a look up of specific servicing information on the specific vehicle, which lookups are often employed in automotive repair handbooks for a certain vehicle by manufacturers of the vehicle or by a third party, such as an after market vendor. Contact data may include the customer contact data, as well as the manufacturer, and/or other service organizations, such as a reliable carburetor or radiator repair specialty service, or a reliable parts wholesaler and/or warehouse. Standardized or customized reports might include a service history, a scheduled maintenance plan, a list of known manufacturer problems or maintenance suggestions, or a history of billings and payments across a single customer with multiple vehicles, or for a single automobile.

Thus, in an exemplary embodiment, entry of a client/matter number by a repairman might result in an inquiry from the presentation layer as to a part to be replaced. Entry of "alternator" might result in an accessing, by the business logic layer from the storage layer, of the available alternators for the vehicle keyed to that client number, and selection of an alternator in the presentation layer might result in the sending, by the business logic layer, of an invoice update to a Word file associated with that client's vehicle, which updating is in accordance with the alternator selected, the client/matter number key, and an instruction from the business layer, in accordance with the business rules therein, as to how Word is to update an invoice. Further, the business logic layer may update an inventory file for that repair shop, cause the ordering of a new part to replace the alternator leaving inventory, and cause the updating of a calendar that a tune-up reminder is to be generated in 12 months due to replacement of that part, for example.

The business logic layer 20 of FIG. 1 may be responsible for not only the integration of presentation information to the presentation layer 10, but also for data storage management and retrieval from the storage layer 30. For example, when an XML communication is delivered to the business logic layer 20 from the presentation layer 10, the business logic may be required to either store user-generated or imported data to a database appropriate to contain that data. For example, if accounting information is imported from a standard accounting program, the business logic 20 may route the data to the appropriate database, in an appropriate format, such as by a data normalization, so that future calls to retrieve that data may be simplistically filled. Thus, the business logic may be responsible for converting and formatting imported, or exported, data, as well as controlling an appropriate XML communication link 22 from the logic layer 20 to the storage layer 30.

When a retrieval of information is requested in the presentation layer, the business logic layer may be responsible for multiple accesses to either multiple areas of a single database or multiple areas of multiple databases in order to provide the inter-related data back to the presentation layer 10. Further, the business logic may be responsible for updating and/or manipulating multiple areas in at least one database in accordance with the requested manipulation or retrieval.

The business logic layer 20 may be composed of at least one core module that performs item/matter data correlation, temporary storage for manipulation, access, maintenance, and reporting functions. A specific business application shell, such as a law office application shell or an automotive repair application shell, including the attendant business rules correspondent to that shell, may be installed atop the at least one core module, so as to be compatible with a customized graphical user interface of the presentation layer 10.

The storage layer 30 may be responsive to the business logic layer 20 via communication on link 22. The interface link 22 utilizes custom tags, or keys, generated by or within the business layer 20 to define the targets of an acquisition request, assemble a transmission, and/or validate data stored or retrieved in a primary request for data. Thus, multiple storage or recall operations may occur to store or retrieve related information needed to fulfill the request by the business logic layer 20. The storage layer may incorporate a single or multiple databases, as discussed hereinabove. Such databases may be co-located, or may be geographically separated and may thus use a networked interface.

Figure 2:
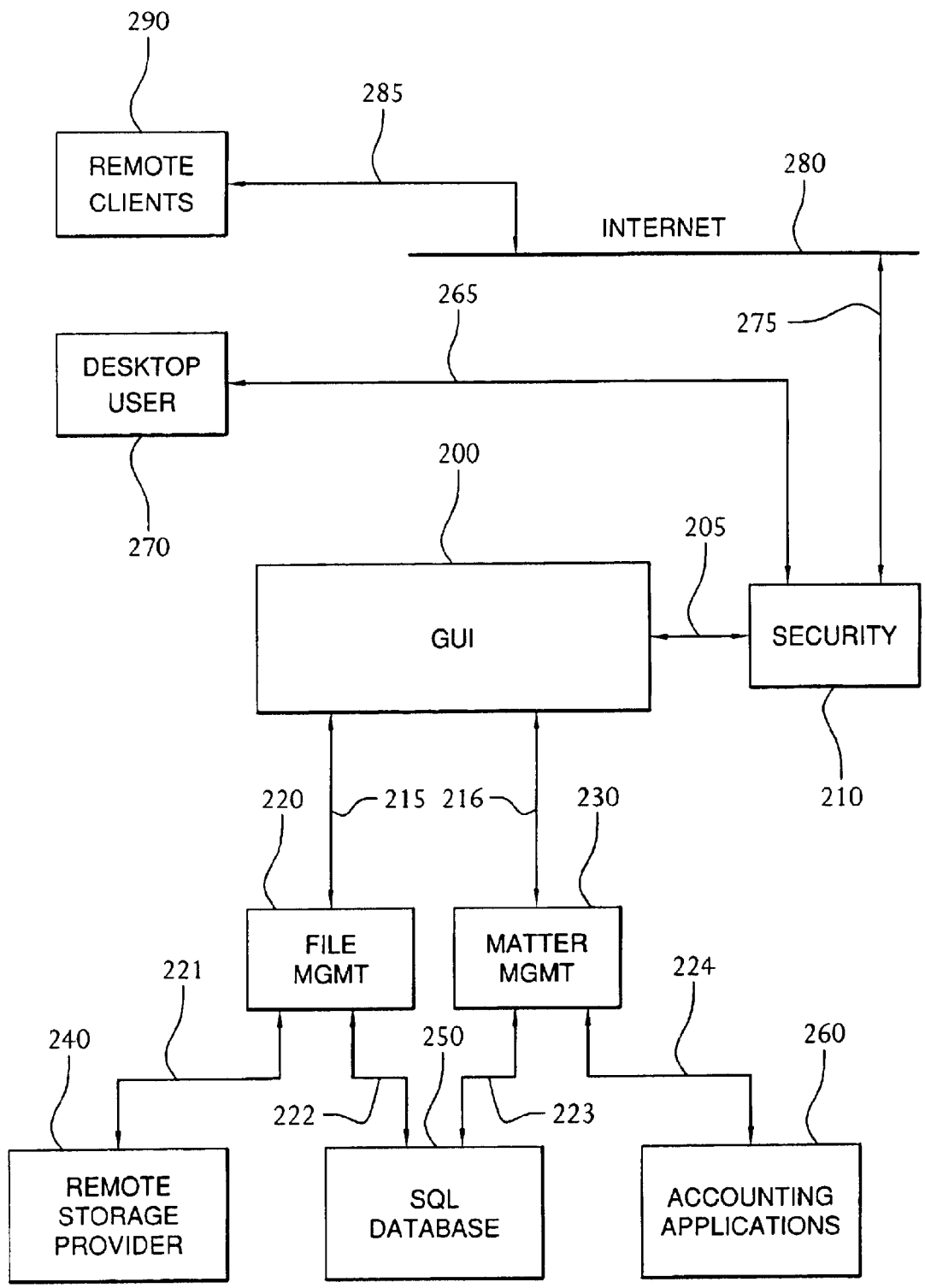
FIG. 2 is a block diagram of the present invention.

FIG. 2 depicts an exemplary item/matter data integrator in further detail. The presentation layer 10 of FIG. 1 may incorporate the graphical user interface (GUI) 200, including the security interface 210 and interconnect 205, and the GUI may be provided via a desktop user interface 270, a communication link 265 and/or links to external networks 275, such as the Internet 280, and/or the servicing of multiple external clients 290 via network links, such as link 285.

The graphical user interface 200 of the presentation layer may include standard windows menu bars, such as with drop down menus. Headings for the windows menu bar may include file, edit, matter management, report, search, and about, for example. Under the drop down menu entitled matter management, the user may select a matter, client or a people sub-menu. Under the matter sub-menu, the user may modify the matter, for example.

The business logic layer 20 of FIG. 1 may incorporate the file management module 220 and its communication links 215, 221 and 222, the matter management module 230 and its communication links 216, 223 and 224, and the application module 260.

The storage layer 30 of FIG. 1 may incorporate a structured query language (SQL) database 250, and/or a remote storage provider 240. As previously noted, the databases of the present invention may be co-located, remotely located, and/or accessible over a networked interface. FIG. 2 depicts a local SQL database 250 and a remote storage database 240.

The graphical user interface (GUI) 200 may be communicatively connected 205 to various other interfaces, including the security interface 210, the SQL database 250, the mass storage element 240, and/or an application, such as an accounting function 260. These resources may be accessed pursuant to file management 220 and matter management 230, such as that performed by dynamic link library (DLL) files within the business logic layer, for example. The file management 220 and matter management 230 may be directly connected to the structured query language (SQL) 250 database, for example.

The security interface 210 may be connected to the GUI 200 to thereby allow the user to view information related to clients 290 over, for example, a web interface 285, and, in certain exemplary embodiments, to thereby allow a client access limited to that client's own account (s). User access may thereby be limited to certain information, as signified by the content filtering, encryption keys, or by "cookies", for example, such that the user may only be able to view certain contacts, or certain matters, or certain fees owing from that client to the service provider. In addition, the ability to add or edit matters may be limited to a specific user or group of users. Alternatively, rather than using network security to limit access, the user may be required to log in when using the present invention.

The matter management 230 provides access to various matters connected with a specific client. For example, billing expenses, or an accounting package 260, may be accessed for a specific client or matter by matter management 230, thereby treating each data entry in an accounting database as a separate, secure data item, and thereby allowing the access only to those data items keyed as associated with that selected client. For example, data items may be keyed into a database, or partition thereof, that serves only that client, or the database may include the key that allows for specific association only with that client. Thereby, the present invention may allow a user to view all aspects related to a given matter, such as billing, from the amount owed to the date paid to the date a check was cashed for example, as keyed to a selected client.

The present invention may also include additional features associated by the matter management 230. For example, contact management allows the user to track all correspondence to/from a particular client, along with any expenses related with that correspondence. For example, the user may track emails, telephone calls (particularly in embodiments employing voice over IP protocols), or a correspondence history list, and roles of communicating parties, by the client matter number. In addition, the length of phone calls, or the number of copies made, for a particular client may be tracked by the client matter number and may be associated, and accessible, together by matter management. The user may input a client number by manual entering, or may import billing codes and times, such as from phone bills, by importation into the system electronically. Expenses and/or contacts and communications may be broken down by the client matter number, thereby providing the user with a detailed list for each client.

The present invention may also include a tracking feature, whereby a user may track various items, such as rents or properties, or expenses or depreciations associated therewith. The user may input information, such as an increase or decrease in rent, which can then be extracted and put into spreadsheets without having to key in electronic formats. This extraction may be performed via a communicative connection to third party accounting software not visible to a user, such as through the use of a browser type software implementation.

The user may also track the opening and closing of matters through the use of the present invention. For example, the user may determine how long a project took to complete by tracking the opening and closing of a matter. Additionally, this can also be used to keep a tally of the number of matters open at a given time.

The file management 220 may include, in part, a DLL, and may enable the user to look at, and search or locate, files. This enables the user to determine which physical redwells or folders contain certain files, or where electronic files may be located or accessed, such as on a network server. The user may also search, add, remove, or edit documents contained within document folders, using file management. The user may search for documents or matters by entering a search term, or by using the client name and category as search criteria, for example, or by searching to determine the physical location of certain documents. For example, documents may be stored on-site, off-site, or electronically. If documents are stored off-site, a request for shipment of the necessary documents may be generated, manually or automatically. A tracking number may be used to-conduct a file search, which tracking number may be associated with a matter number. The file management 220 can also be connected 221 to a storage provider 240 for electronic tracking of externally filed data sources.

The business logic layer 20 of FIG. 1 allows the user to define client names and numbers from the presentation layer 10. The present invention may allow the user to associate people or departments with different client(s) or matters, for example, and to assign roles to these people or departments. New clients may be added to the system, and existing client information may be edited, within the business logic layer from the presentation layer. With reference to FIG. 2, the business logic layer may include the file management DLL, the matter DLL, and the accounting applications, as set forth hereinabove.

Figure 3:
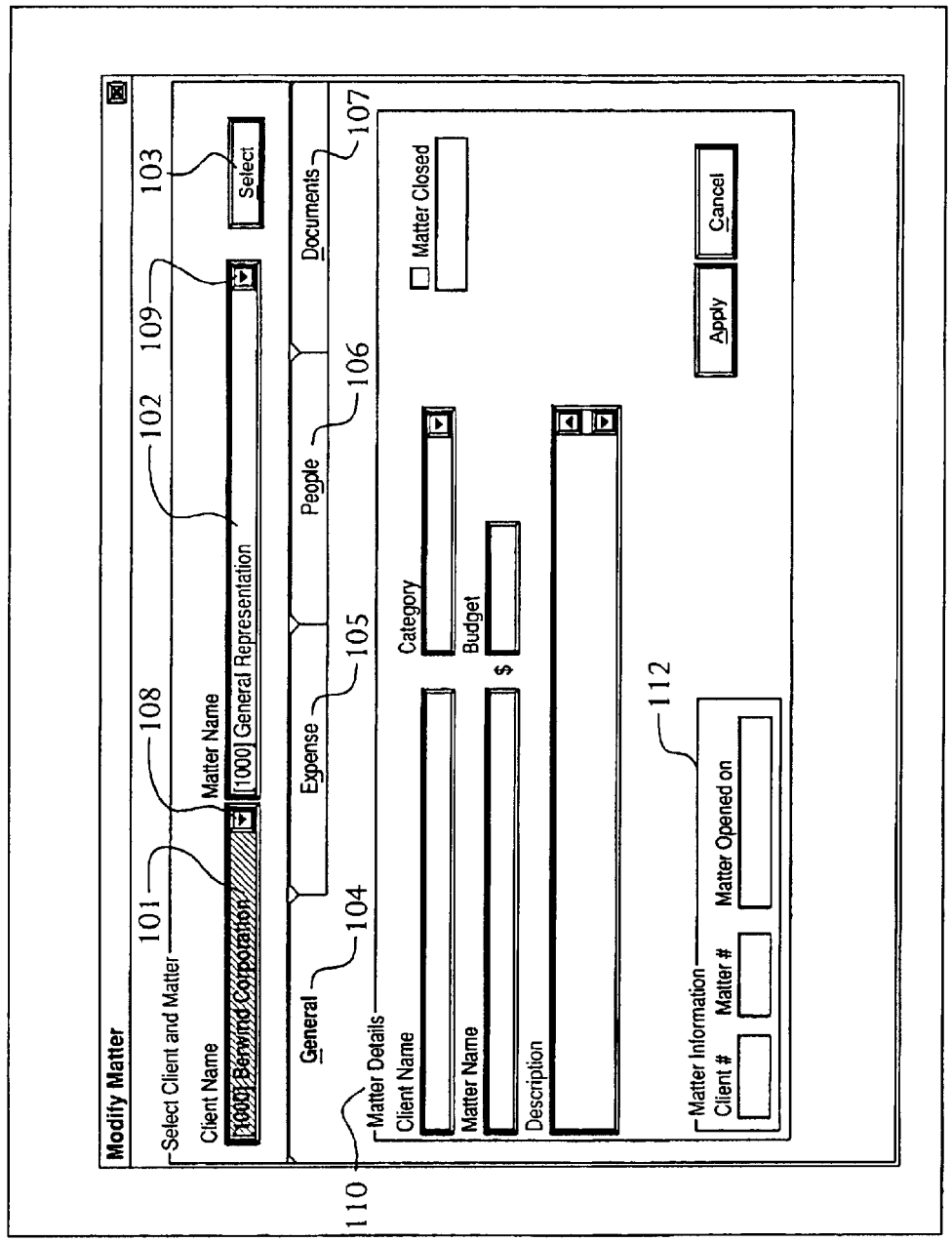
FIG. 3 is a screen shot of an aspect of the current invention.

FIG. 3 is an exemplary depiction of a page layout for the sub-menu "modify matter", wherein the user may alter details about a selected matter. Client and matter designations may appear in fields 101 and 102, respectively. Data relating to the client and the matter may be included in tab menus, such as general tab 104, expense tab 105, people tab 106, and documents tab 107, for example. The client may be selected from a list of clients, such as from a drop down menu, using control 108. Similarly, the matter may be selected from a drop down menu using control 109, or the user may select the entry of new clients and/or new matters. Matter details window 110 may also be displayed. Additionally, a client number, and/or a matter number, and/or a matter origination date, may be displayed in a window 112, such as that entitled "matter information".

After the client and the matter are selected, select button 103 may be depressed, resulting in the presentation of information from the database. The matter details field 110 and the matter information field 112 may reflect the information that is currently in the database relative to the client name and matter selected.

Figure 4:
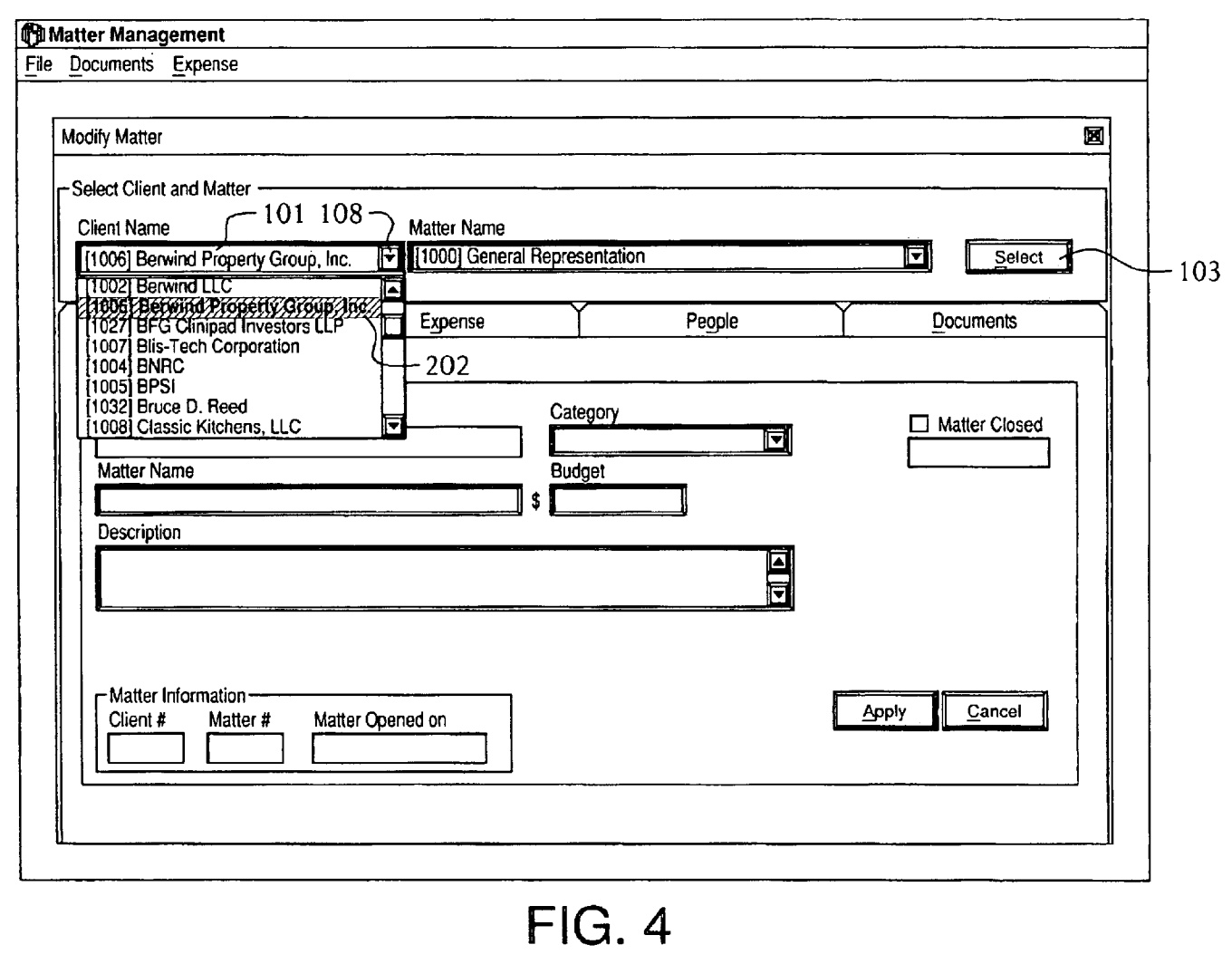

FIG. 4 depicts an exemplary modified matter screen of FIG. 3, wherein drop down select button 108 has been depressed to produce a drop down menu for the client name.

In this instance, the company name 202 has been selected. Once a client is selected, the user may run reports on the client, such as the amount owed, the amount paid and current matters that are pending. Select button 103 is depressed and FIG. 5 may then be displayed.

Figure 5:
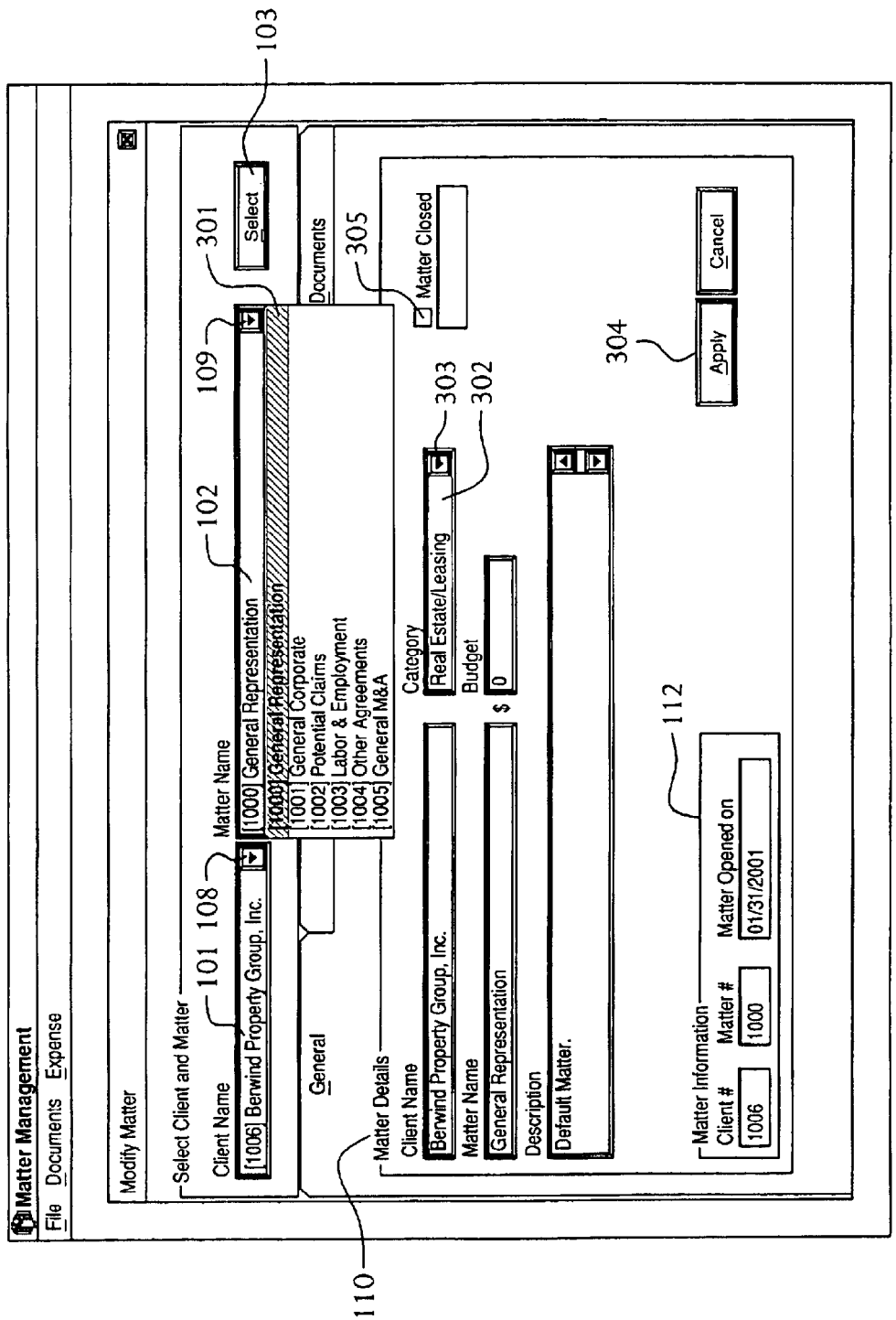
FIG. 5 is a screen shot of an aspect of the current invention.

FIG. 5 displays an exemplary modify matter screen of FIG. 3, wherein the general tab is selected, and information related to the client shown in field 101 and the matter shown in field 102 is displayed. The relevant general information may be displayed in the matter details tab 110. Defaults may be assigned to a client, and each client may have different default matter types. For example, the user may choose to select the 1000 series of numbers for general representation matters, the 2000 series of numbers for labor and employment matters, the 3000 series of numbers for intellectual property matters, and so on. Alternatively, the user may choose to assign each matter in sequential order, without separating matters according to category. Note that the client name, default matter name, default category and description have been displayed in the FIG. 5 matter details field 110.

Additionally, the matter information field 112 may be displayed, showing the client number, the matter number, and the date of origination of the matter, for example. In this instance, general representation 301 is selected, and select button 103 is depressed. The category within the matter details 110 may be selected by using drop down menu control 303, and may be displayed in field 302. This allows a user to select a category within which a certain work may reside. After the category is selected, such as Real Estate/Leasing 302 in this exemplary embodiment, the layout of FIG. 6 may be displayed.

Figure 6:
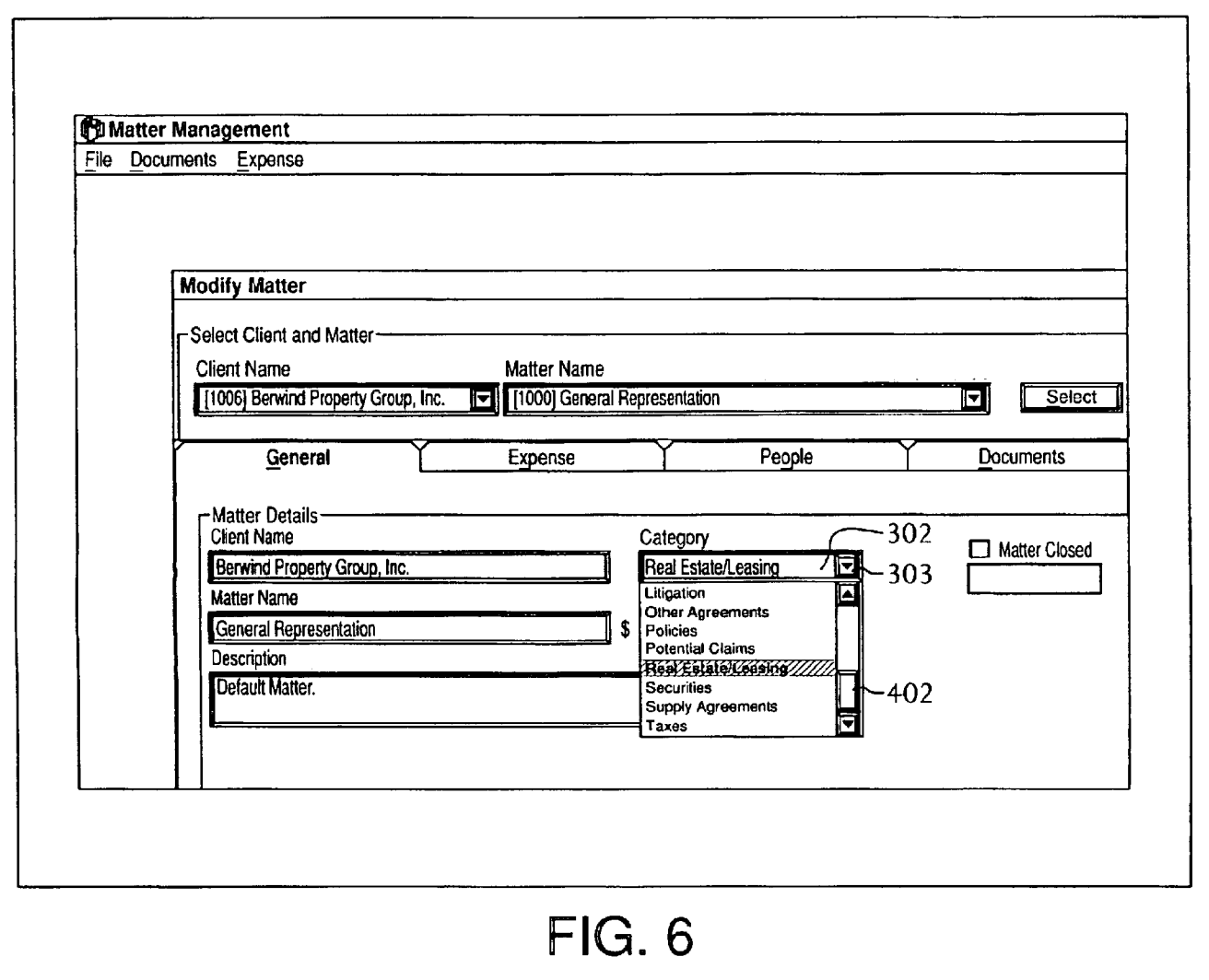

FIG. 6 is an exemplary embodiment of a drop down menu for the category selection field 302. Selection of a category allows the user to define the client and matter being searched, or the item being searched for. It should be noted that slide bar 402 may appear hereinthroughout wherein the number of selections for a particular selectable item is too great to fit into a drop down menu box size, for example, to thereby allow the user to scroll down to the desired selection. Categories may include matters worked on for a particular client. For example, categories may include administration, borrowing/finance, confidentiality agreements, depositions, dispositions, employment agreements, environmental, general corporate, general M&A, general representation, intellectual property, license agreements, litigation agreements, other agreements, policies, potential claims, real estate/leasing, securities, supply agreements, taxes, and the like. The result of the category selection 302 may be retrieved and displayed by depressing the apply button 304 of FIG. 5, for example. Upon depressing the apply 304 button, the matter details field 110 may be updated to reflect a specific description of the category within the matter, or a status may be indicated as to whether the matter is still open or closed 305.

Returning now to FIG. 3, expense tab 105 may be selected by the user to display specific expenses associated with a specific client and matter displayed in fields 101 and 102, respectively. Under the expense tab 105, the user may perform multiple tasks. For example, bills may be inputted into the system by the user using the matter number, thereby also allowing the user to view expenses related to that particular client or matter. The user may additionally search for an invoice, either payable or for payment(s), and may do so in multiple ways. For example, the user may search by invoice number, matter number, or by the name of the billing attorney. The user may also select an invoice for payment and pay it, manually or automatically. A user may also select repeating expenses, such as rent, salaries, or insurance, to be automatically paid on a certain day of the week, month, or year, for example. Further, the user can track payments, such as by client/matter number, internally to discern where bills are in the payment process.

Under the expense tab, the user may negotiate "knock downs" or discounts for a particular client and can also track these discounts. Under this tab, the user may additionally check the status of a payment, and whether the payment is a partial payment, paid in full, or includes an adjournment. The user may also determine the payer of the invoice, such as whether it was paid by the company, a subsidiary, or a client. The user may post a payment when received, and track a balance due. The user may, in certain embodiments, pull charts of the user's own accounts, or of a client's accounts such as by using drop down menus. For example, the user may select and pull legal accounts. Thereby, the user may view aspects of an account, such as the holder of account, what it relates to, how much money is owed, how much money was paid, what services were performed, the date the invoice is due, or when the invoice was paid. By using accounting software, such as Quickbooks®, the user may copy the invoice information into accounts receivable or accounts owed. For example, if the user is viewing a client's account to determine whether an invoice has been paid, the user can automatically transfer this information to the user's account, thereby updating the amount owed by the client or received by the user.

Figure 7:
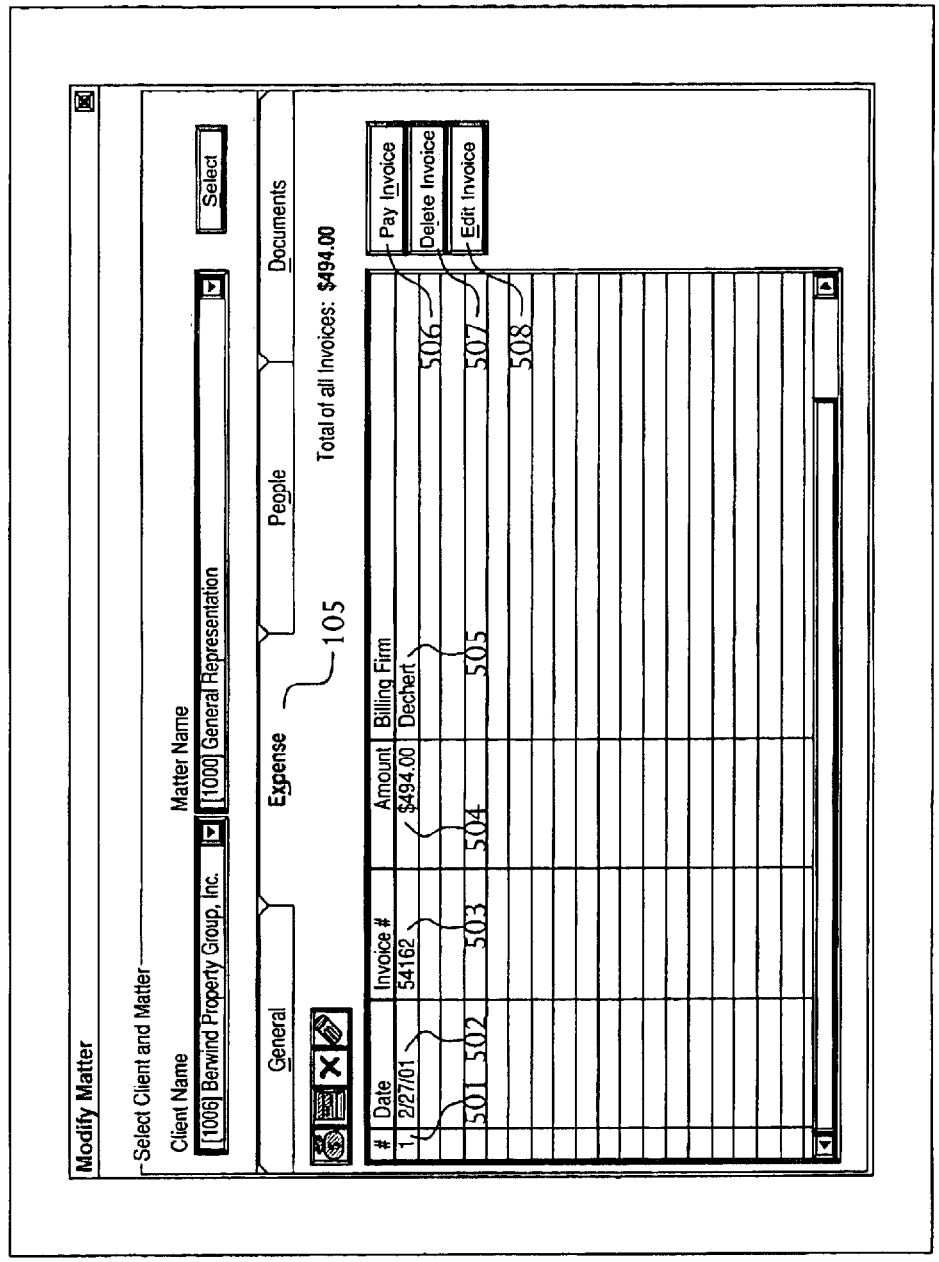
FIG. 7 is a screen shot of an aspect of the current invention.

FIG. 7 is a depiction of an exemplary embodiment of expense tab 105 that results from the selection of a specific client name and a specific matter name. In the embodiment shown in FIG. 7, an expense number 501, and the date of the expense 502, the invoice number 503, the amount of the invoice 504, and the name of the billing firm 505, may be displayed. Note that the name address, account numbers and comments on the invoice may be entered into the field for the billing firm 505. The user has the option of paying the invoice by selecting the pay invoice button 506, deleting the invoice by selecting the delete invoice button 507, or editing the selected invoice by selecting the edit invoice button 508, for example.

Upon selection of the pay invoice button 506, invoice information, including the date of any payments, the invoice number, the amount of the invoice, and the billing firm or company, may be provided. Also displayed may be information concerning payments made by date, amount, and the person or entity that paid the invoice. The user may select an invoice to be paid and select a payment date and a payment amount, as discussed hereinabove.

The delete invoice button 507 of FIG. 7 may delete the selected invoice, such as after a confirmatory warning is given and the user confirms the deletion action. The edit invoice button 508 of FIG. 7 may bring up a window that displays the details of a specific invoice, such as invoice number, payee, descriptive category, memo information, date and/or amount. Additionally, line item details may be available to break down itemized charges of the invoice to provide traceable billing information, as tracked by entry of a client matter number, or as timed by the amount of time a user spends in a document keyed to a client matter number, for example. Itemized information for invoices to be sent out to a client may be edited such that the detailed information may be provided to the client.

Returning now to FIG. 3, information for the selected client 101 and matter 102, and contacts associated with that client and matter, may be selected by choosing a people tab

Figure 8:
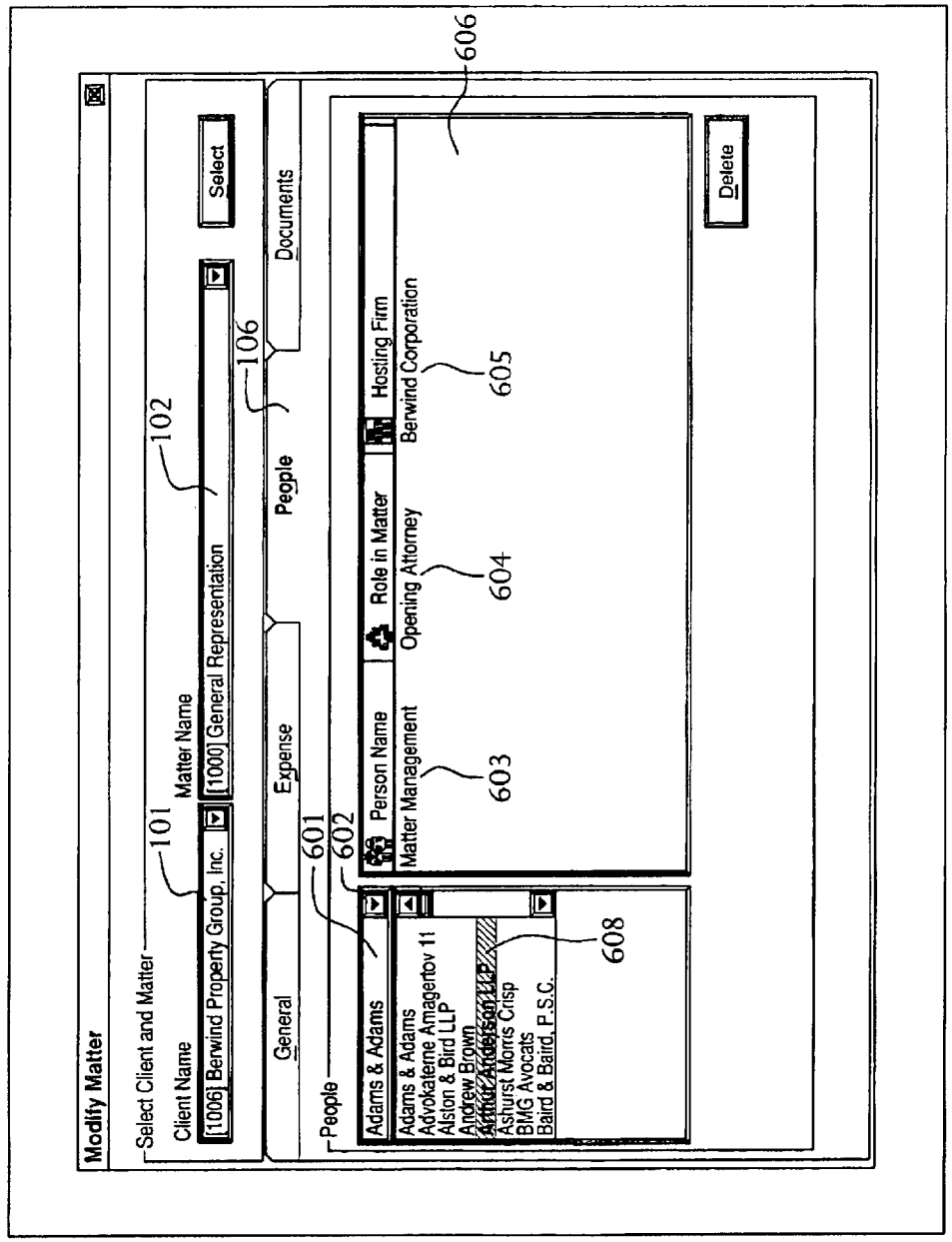
FIG. 8 is a screen shot of an aspect of the current invention.

106. FIG. 8 displays an embodiment of the invention wherein contacts associated with the client name and the matter name in fields 101 and 102, respectively, are displayed. These contacts can be assigned roles, such as consultant, opposing counsel, and the like. The name of a company or firm may also be displayed in field 601. The drop down menu control 602 may be used to display various company or firm names, such as in alphabetical order, in a manner similar to drop down menus discussed hereinabove.

In FIG. 8, a firm 608 has been selected, and an individual from that firm may be associated with the client name and the matter name in fields 101 and 102, respectively. A display window 606 may provide details of the person associated with the firm or company. The person's name may be listed 603, the person's role in the matter may be listed 604, and the name of the hosting firm may be listed 605, for example. Upon double clicking, or selection, of a firm or company name from the drop down window for the firm and company field 601, the display of FIG. 9 may appear.

Figure 9:
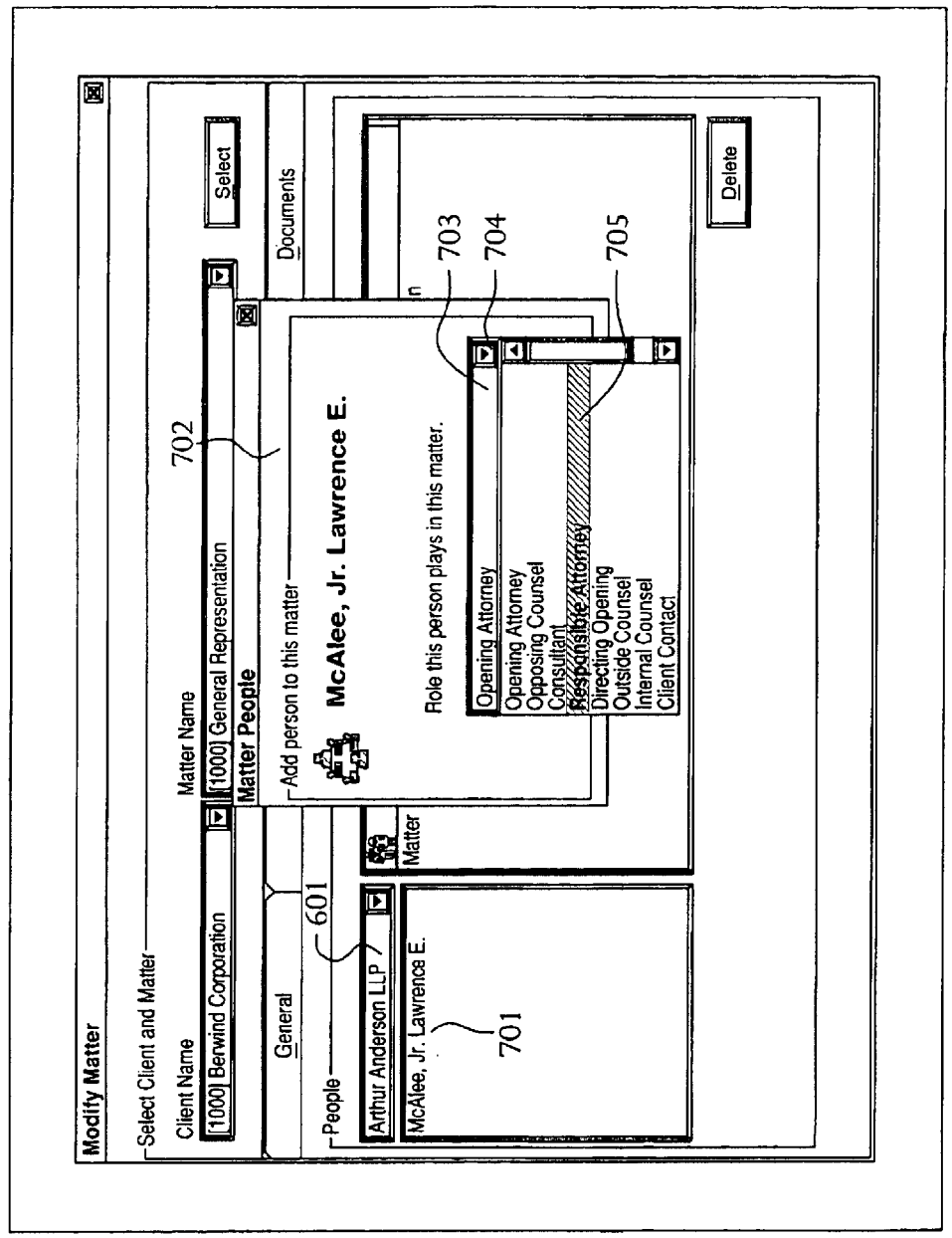
FIG. 9 is a screen shot of an aspect of the current invention.

FIG. 9 illustrates a display that allows the user to select at least one contact, and to select the role that the contact has in the particular matter. For example, field 701 displays the names of individuals associated with the company or firm displayed in field 601. Selection of a name within field 701 may provide pop-up window 702, thereby displaying the name of the individual selected. The user may select the role of the individual in the matter by placing the proper information in the role field 703, using the drop down menu control 704, for example. In this example, responsible attorney 705 is selected as the role for the selected individual. It should be noted in FIG. 9 that multiple individuals associated with the firm or company listed in field 601 may appear in field 701. Accordingly, the user may select any of those individuals, or multiple individuals, to play a role in the matter. For example, a first individual may be a consultant, a second individual may be a responsible attorney, a third individual may be internal counsel, and so on. After selection of a particular role for a particular individual, the display of FIG. 10 may appear.

Figure 10:
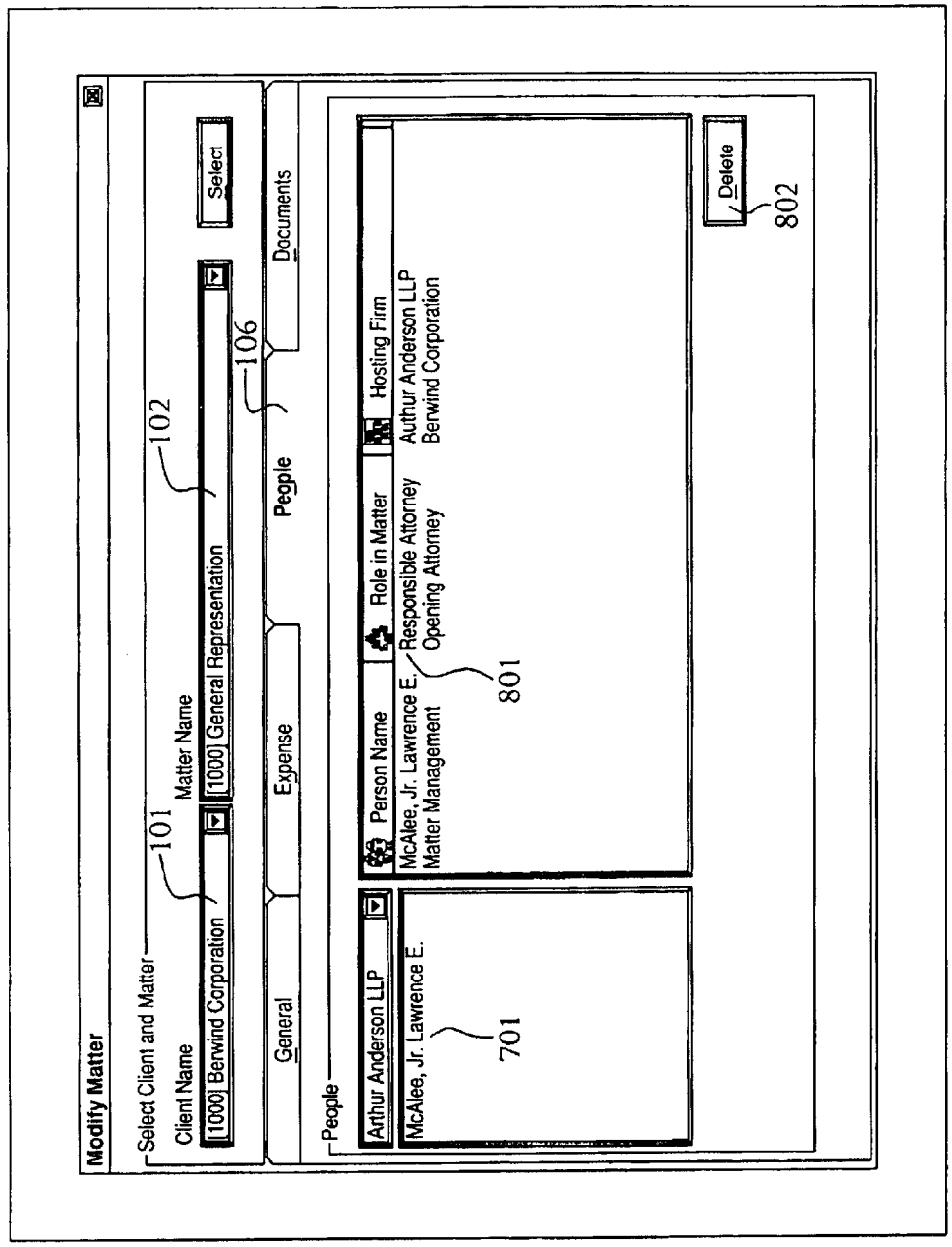
FIG. 10 is a screen shot of an aspect of the current invention.

FIG. 10 displays the exemplary results of selecting a client and matter 101 and 102 respectively, selecting the people tab 106, selecting a particular company or firm 601, selecting the name of a person within the firm 701, and attributing a role in the matter to that person name 801. The user may also select a person name within field 606 and delete that person from the listing, such as wherein that person is no longer associated with the matter. Deletion may be accomplished by depressing the delete button 802 after a name has been selected, for example.

Returning now to FIG. 3, documents related to the selected client and matter 101 and 102, respectively, can be selected and edited via the documents tab 107. The user is able to create folders or redwells, either in the physical realm or the electronic realm, and describe the contents thereof. The user may select from a list and add "manilas" (folders) to an existing redwell. The invention thereby operates, in part, in a manner comparable to document management software, such as DOCS Open or Imanage, thereby enabling the user to search for documents electronically. Alternatively, the present invention may communicate electronically with DOCS Open or Imanage in order to access such electronic documents, pursuant to a client matter number entered in the presentation layer and passed through the business logic layer, for example. The user may also search directly through the matter management using the client matter or other information. The document tab 107 allows the user to select and edit documents associated with the client and matter selected.

Figure 11:
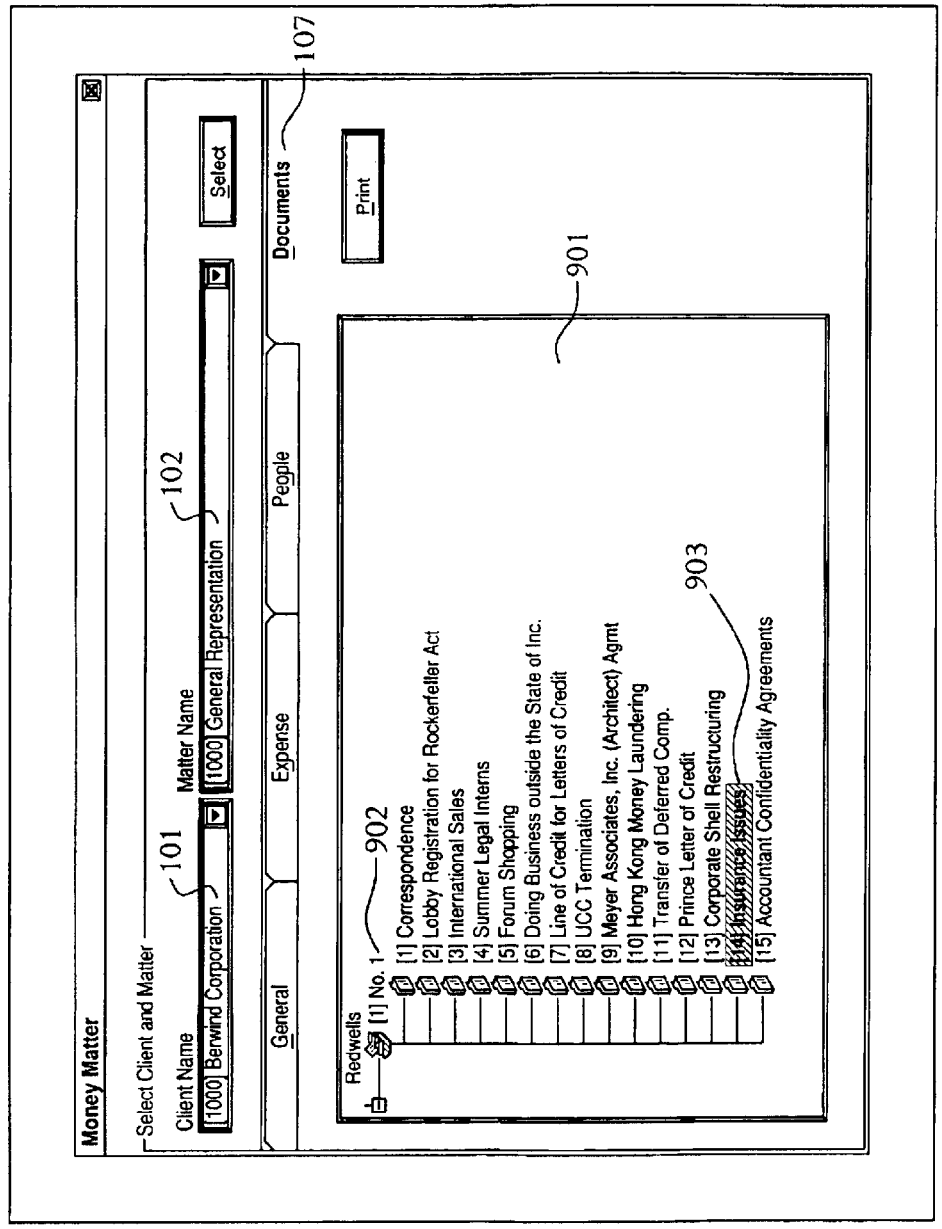
FIG. 11 is a screen shot of an aspect of the current invention.

FIG. 11 illustrates an embodiment of the documents tab 107. In this example, the document associated with the selected client and matter is displayed in field 901. Document folders, such as redwells 902, may be indicated in document field 901. Redwells, consisting of folders, contain multiple documents including the one highlighted, which is insurance issues 903 in this example. In the current example, double clicking on insurance issues document number 14, item 903, displays the software display embodiment shown in FIG. 12.

Figure 12:
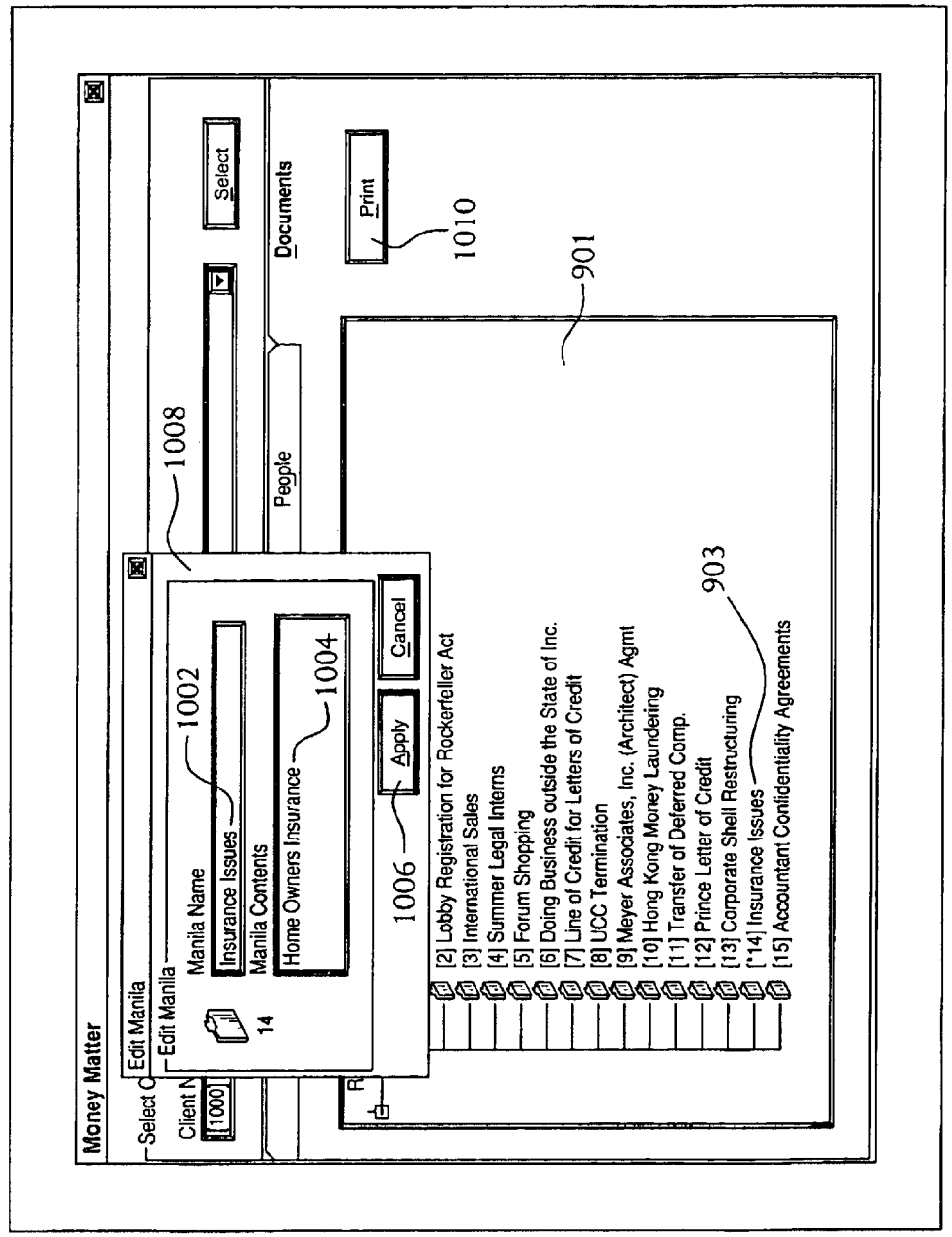
FIG. 12 is a screen shot of an aspect of the current invention.

FIG. 12 illustrates an embodiment showing an edit field for the selected document 903. A pop-up window 1008 is displayed which contains the folder name 1002 (the manila name), as well as the folder contents (the manila contents) 1004. Notice that the selected document number 14, item 903, may no longer be highlighted, but may be marked with an asterisks to indicate that it has been selected, as illustrated in the pop-up window 1008. Should the user wish to add or remove documents within a folder, the user may do so by entering information in the field 1004 and applying the information using the apply button 1006, for example. Print button 1010 may be used to print a document available in electronic form once that document is selected from within a folder. If the document is not in electronic form, the software may ask if the user wishes to request a copy of the selected document from a physical storage location, for example. If the document is electronically connected with a document archive center, an electronic request may be sent in accordance with a user instruction requesting the document. If the document is connected to a physical archive center or an archive center request service, the software may generate a request for the user. In either case, the a copy of the document may be made available to the user, and a confirmation of the request may be provided to the user.

The present invention may additionally generate reports based on item and matter. For example, in a law office environment, it may be desirable to inspect the status of a certain matter with respect to a given client. A report may be generated detailing the client and the specific matter, as well as the expenses, billing invoices, and payment made, and/or credits or retainers credited. Such reports may be structured, customized and/or saved, such that updated reports may be generated based on the same format in the future. Reports may be generated, for example, across multiple matters under a single client, or across multiple clients under a single matter, thereby illustrating status across all matters, including, for example, corporate, labor law, taxes, intellectual property, or the like. For example, an intellectual property law department may run an intellectual property matter against all clients to see the financial status of all intellectual property clients, and may aggregate the results to produce an income and debit report.

Additionally, informational reports may be available. For example, in a law office scenario, a client and matter may be selected, and all contacts associated with that matter may be identified, including the roles thereof. Likewise, a report may be written that lists a matter across multiple clients to identify key personnel involved. This type of report may be useful to identify specialists in a particular field such as for expert witnesses or supporting counsel.

Reports may be generated across document types. For example, if an attorney seeks information regarding a specific legal matter, such as a negligence matter, a document search can be run for an "injury" document, and multiple clients and matters may result. The searching attorney may produce a report of all client and matters relating to injuries, and may seek out the available personnel involved in those actions, because personnel are correlated to client, matter, and documents through the use of the present invention.

An additional report type might include the selection of an individual or entity name, and the subsequent reporting of all matters associated with that individual or entity. For example, within a law office, one could report on an individual, and determine if that individual has been involved in more that one matters, or with more than one client, which may occur, for example, with expert witnesses, local counsel, or multiple lawsuits.

Figure 13:
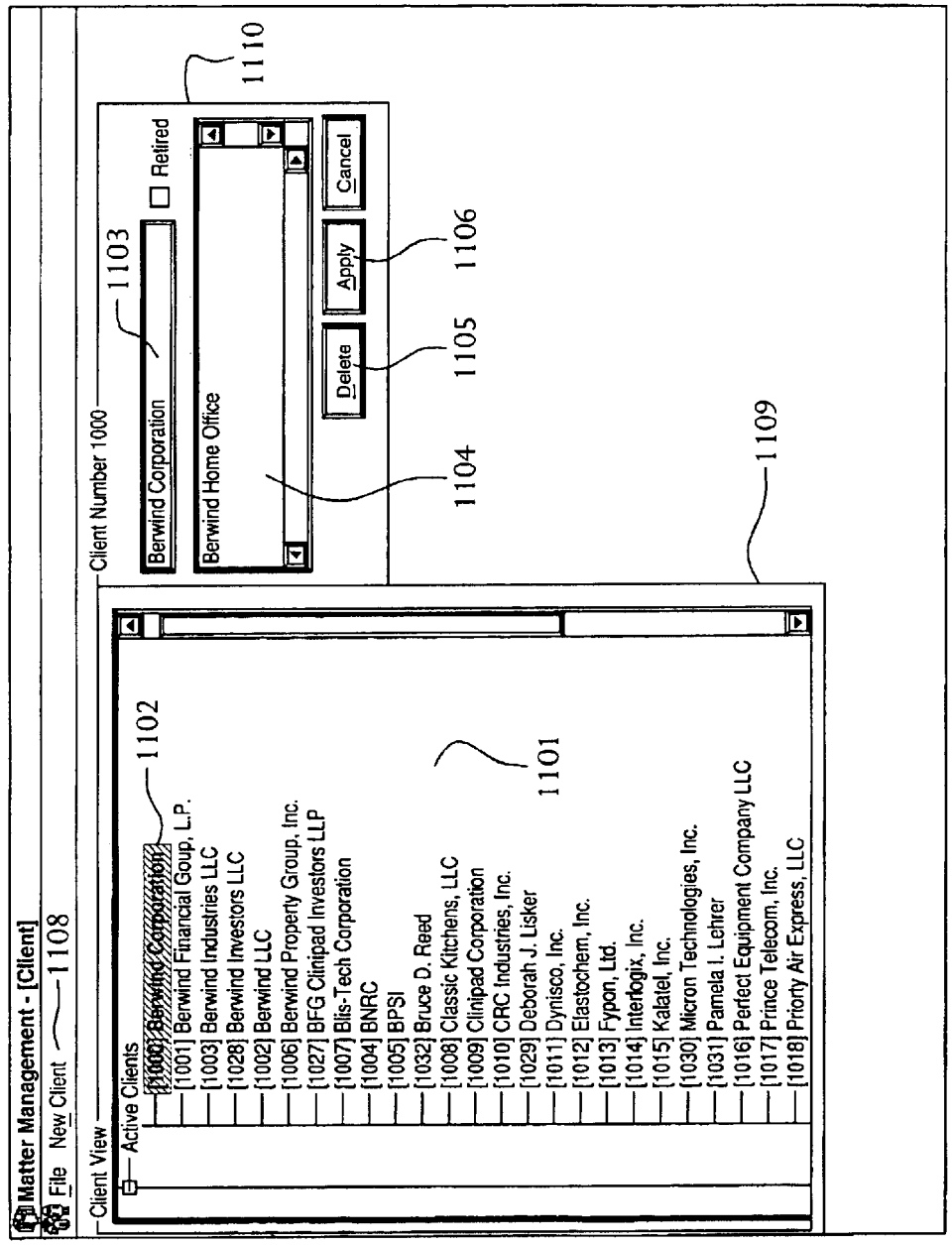
FIG. 13 is a screen shot of an aspect of the current invention.

FIG. 13 illustrates an embodiment wherein the client sub-menu under "matter management" has been selected to enable the user to edit specific client information. Active or inactive clients may be seen in the client view 1109. The client selection field 1101 may be utilized by the user to select a particular client. In this example, a company 1102 is selected. Note that the selection that appears in the client display box 1110 is displayed in field 1103, along with any descriptive information for the client in field 1104. The user may enter additional information into this field 1104, the user may delete information by using the delete button 1105, and/or the user may apply additional information by depressing the apply button 1106, for example. Thereby, the user may enter information concerning specific clients, active or inactive.

In addition, the user may add new clients, using the new client drop down menu 1108. New clients may be assigned the next available client number, and the user may enter a description for that new client. The new client may then be displayed alphabetically in field 1101, along with the other active clients. Inactive clients may also be displayed to determine status of the client, such as to illustrate whether work has been completed, or if a file has been transferred to another firm, for example.

Figure 14:
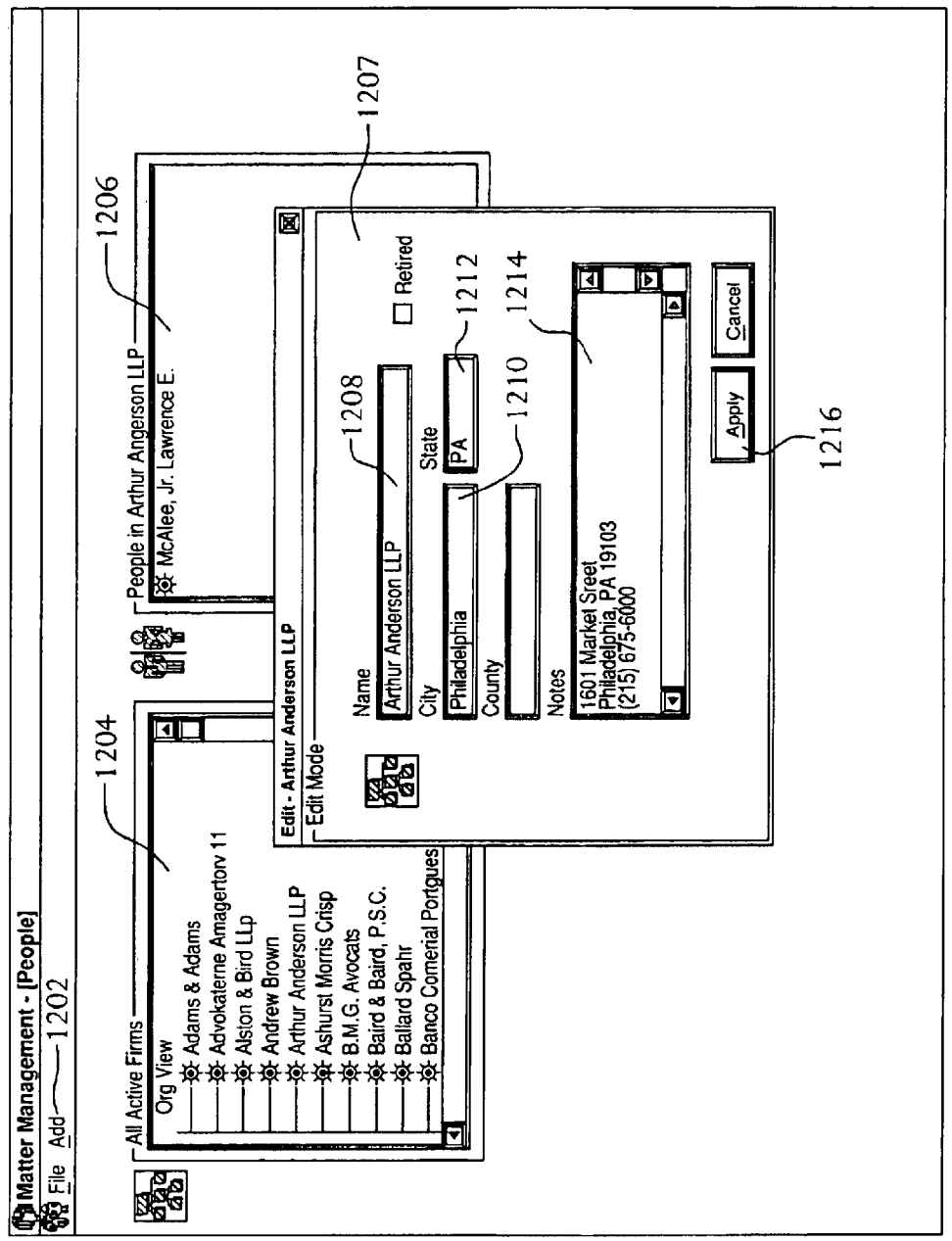
FIG. 14 is a screen shot of an aspect of the current invention.

FIG. 14 is an illustration of an edit screen in the "matter management" drop down menu. Active firms may be displayed, from which the user may make a selection in the organization view field 1204. In this instance, a company is selected, and a member of the personnel of the company is displayed in field 1206. Upon selection of the specific firm, an edit mode pop-up window 1207 may appear. Within the edit mode pop-up box may be the name of the organization 1208, the city and state of the organization, 1210 and 1212, and any notes concerning the firm 1214, for example. In this example, the address of the firm is provided, however, the user may apply any additional information or notes into field 1214. The user may add notes regarding a person in the firm for future reference, for example. For example, the user may describe the person's performance, or may list some personal information in order to facilitate a business relationship. This information can be stored in the storage layer by using the apply button 1216, for example. Additional firms or organizations may be added using the add drop down sub-menu 1202 and entering the firm name, along with people associated with that firm, and any additional information, in the edit mode field 1214, for example.

Figure 15:
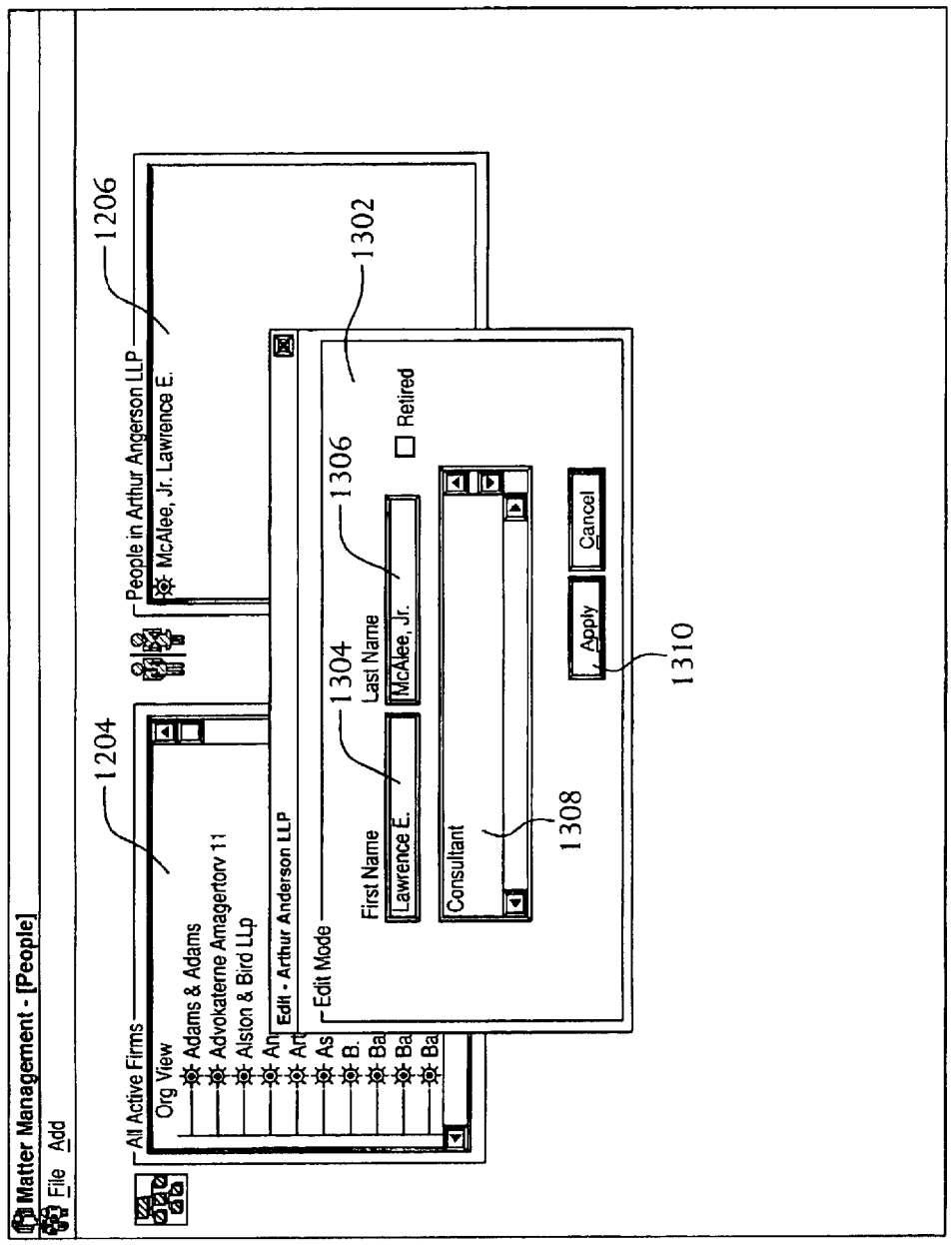
FIG. 15 is a screen shot of an aspect of the current invention.

FIG. 15 is a depiction of an embodiment associated with FIG. 14. In order to edit information concerning the people of the selected organization, the user may highlight the person shown in field 1206 of FIG. 14, and the pop-up window 1302 of FIG. 15 might then be displayed. Within the pop-up window, the first and last name of the individual, 1304 and 1306, respectively, may be displayed along with the descriptive field 1308, which may include the role of the individual, for example. In this case, the user has entered the word consultant to indicate the role of the individual. After the entry is made, the user may apply the information to the database by depressing the apply button 1310, as discussed hereinabove.

Figure 16:
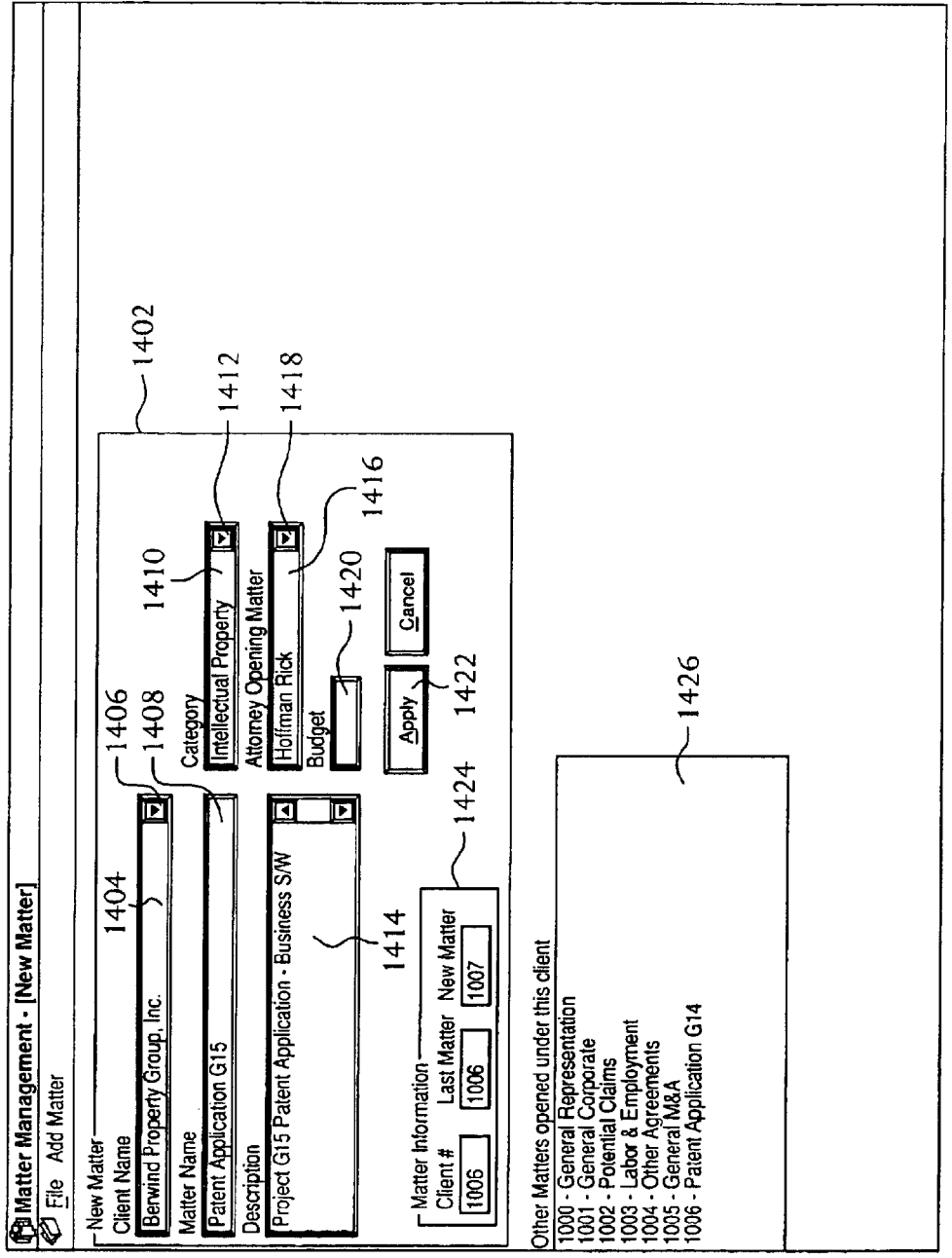
FIG. 16 is a screen shot of an aspect of the current invention.

FIG. 16 illustrates, in part, the addition of a new matter to the matter database. The new matter entry window 1402 may display the client name 1404, the matter name 1408, and the matter description 1414, for example. The client name may be selected using drop down menu control 1406, such as to select a client from a list of clients in a drop down menu. The new matter name can be entered by the user into field 1408. The user may also add a revised description into the entry field 1414. A category of the new matter may be entered into field 1410, such as from a pre-selected group of categories using drop down menu control button 1412. Additionally, the name of the user opening the new matter can similarly be entered into field 1416, using drop down menu control button 1418.

When entering into the new matter display, matter information, such as the client number that was selected, the last matter number, and the new matter number, may be displayed. In addition, other matters opened under the same client may be displayed in field 1426. Note that the last matter entered 1006, patent application G-14, is listed in field 1426, and that the new matter number in field 1424 has been assigned the next higher number, in this instance, 1007. This number represents the next new matter that is being named in field 1408, and described in field 1414, by the user. In addition, a budget for the new matter may be entered into field 1420, in order to control costs and track attorney progress, for example. Although not depicted in the FIG. 16, the present invention may enable email updates relating to, for example, a budget, to the user so that the user is informed of budget constraints. The user may thereby track spending or billings related to the new matter. Upon depression of the apply button 1422 in FIG. 16, the display of FIG. 17 may be presented to the user.

Figure 17:
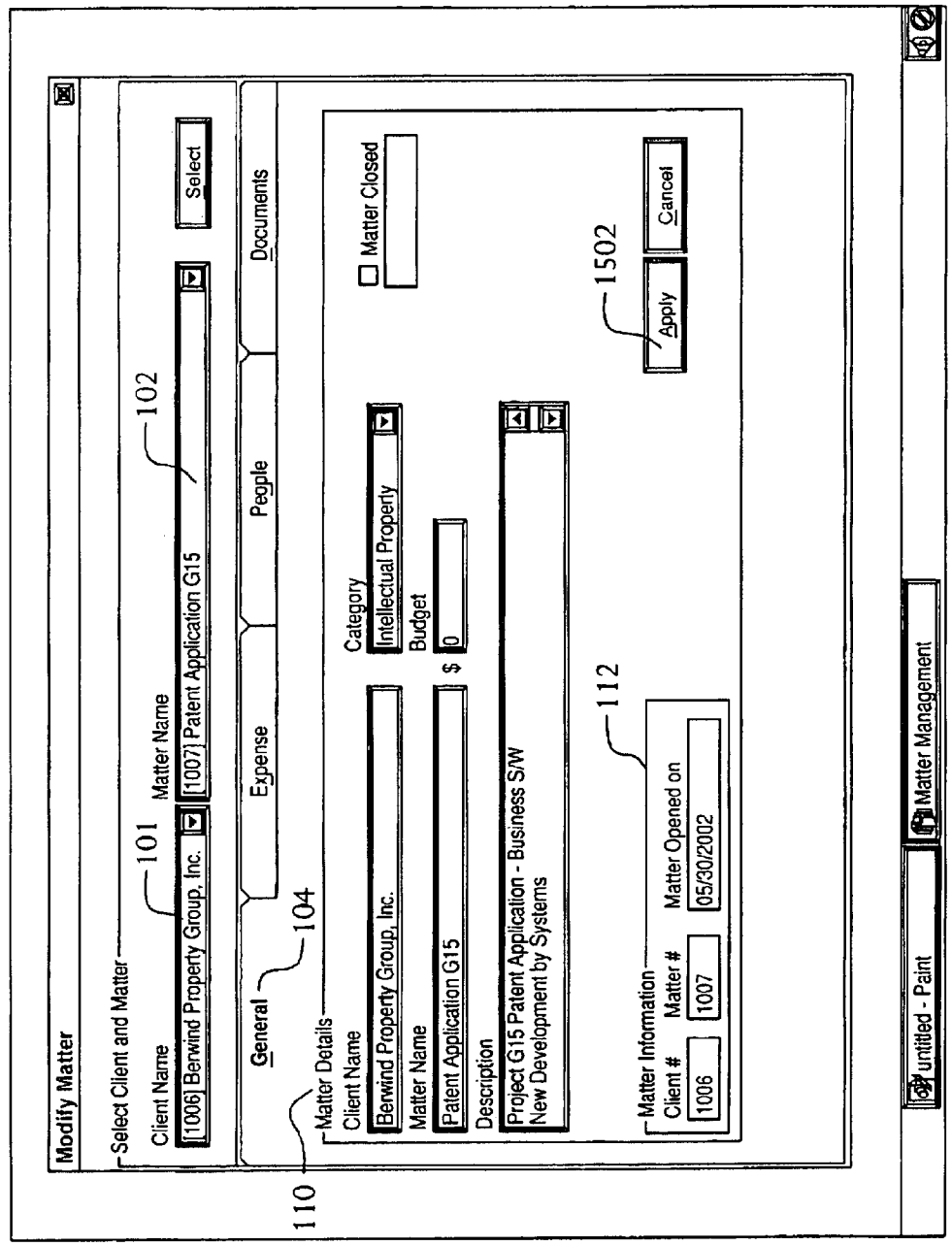
FIG. 17 is a screen shot of an aspect of the current invention.

FIG. 17 illustrates the new matter information that was entered into the system via FIG. 16. FIG. 17 display the client name 101, matter name 102, and defaults to the general tab 104 showing matter details 110, as well as matter information 112 which includes the client number, matter number, and the date the matter was opened. A description of the matter, along with the category thereof, may also be provided. As in FIG. 3, this information can be further edited and added into the system by utilizing the apply button 1502, for example.

Figure 18:
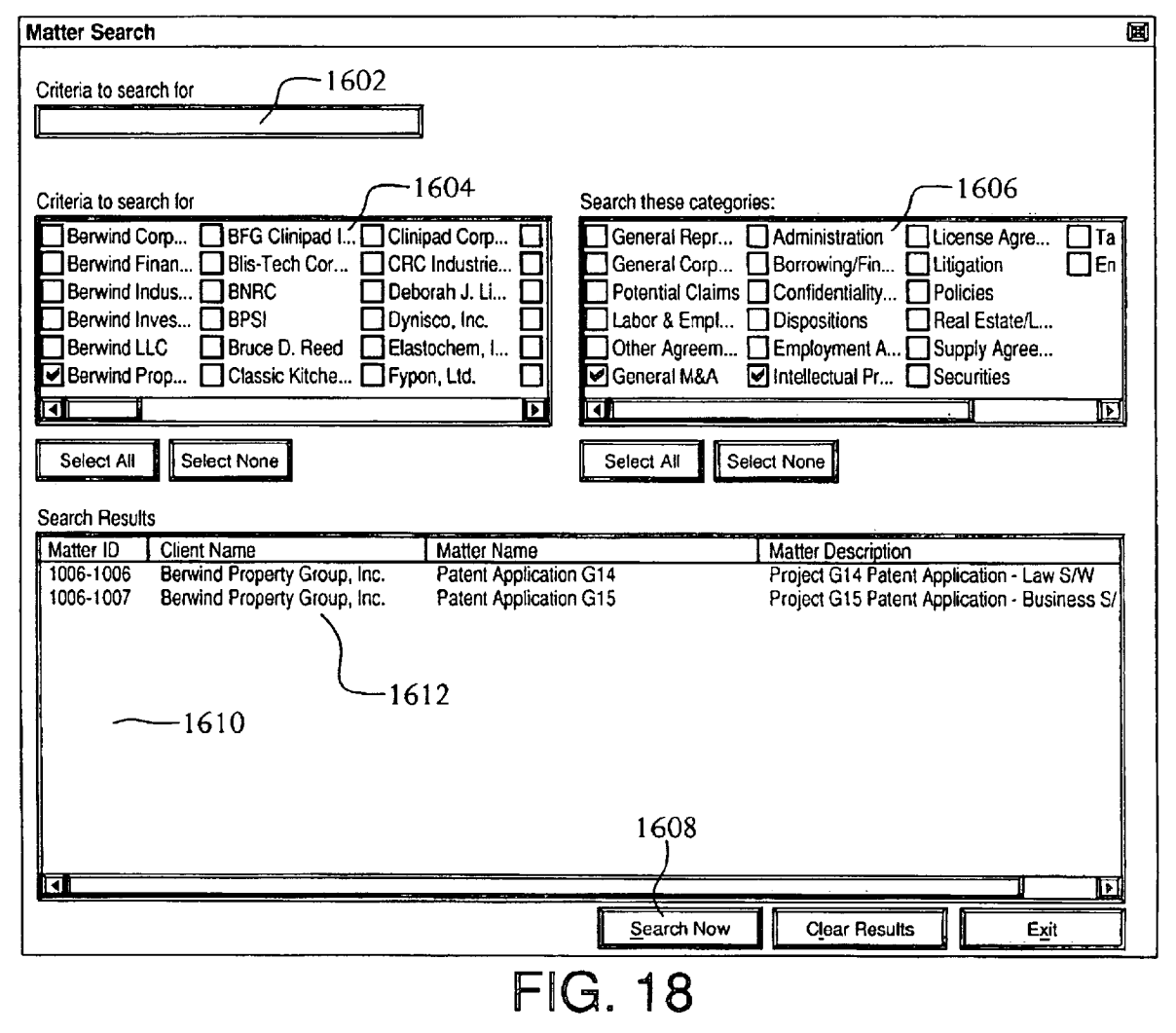

FIG. 18 illustrates an embodiment of the present invention displaying the search mode. The user may enter search criteria into field 1602, or the user may use the matrix approach searching both clients in 1604 and categories in 1606, for example. The user may search both active and retired, or inactive, clients. In the present example of FIG. 18, a client within the client select field 1604 has been checked, and a category within the category field 1606 has been checked. The user may depress the search now button 1608 to display the information in field 1610. Therefore, the example of FIG. 18 demonstrates the use of the search tool in order to find a specific matter using certain clients and categories as the search criteria. If the user knew information about the client or matter, the user could enter that keyword into the search criteria field 1602, depress the search now button 1608, and a search would provide relevant information about the selected client, for example.

Figure 19:
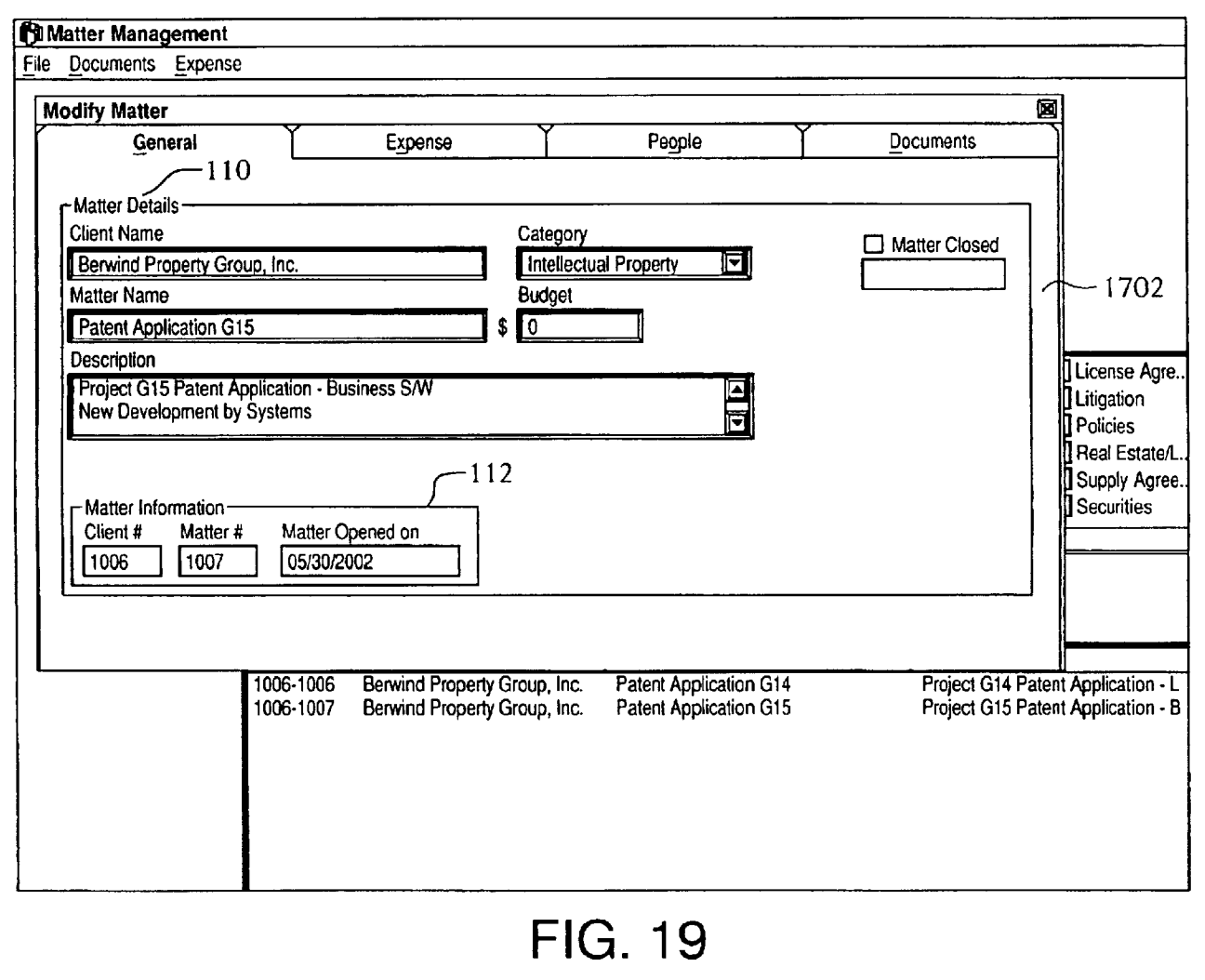

FIG. 19 is an exemplary display of the search results of FIG. 18. Shown in FIG. 19 are the search results field 1702, which includes matter details field 110 similar to that of FIG. 17, and the matter information field 112, including client number, matter number and the date the matter was opened.

FIG. 20 illustrates an embodiment of the present invention wherein the sub-menu "document search", found in the "search" drop down menu, is selected. The user may search within matters or categories by a keyword. The search may seek all matters containing that keyword. Thereby, the user may locate documents relating to old details which can then be cut and pasted for use in new details. In the example of FIG. 20, criteria entry box 1802 allows a user to input a keyword or phrase, and, in this case, a keyword is entered into entry field 1804. The search may be conducted by depressing the search button 1806. Search results may be displayed in the search results box 1810, wherein the individual search results may be displayed by client name, matter name, redwell or folder number, and/or manila number and manila name, in field 1808. Double clicking on a highlighted entry may allow the user to modify manila folder contents, or print the search results using the print button 1006.

Figure 21:
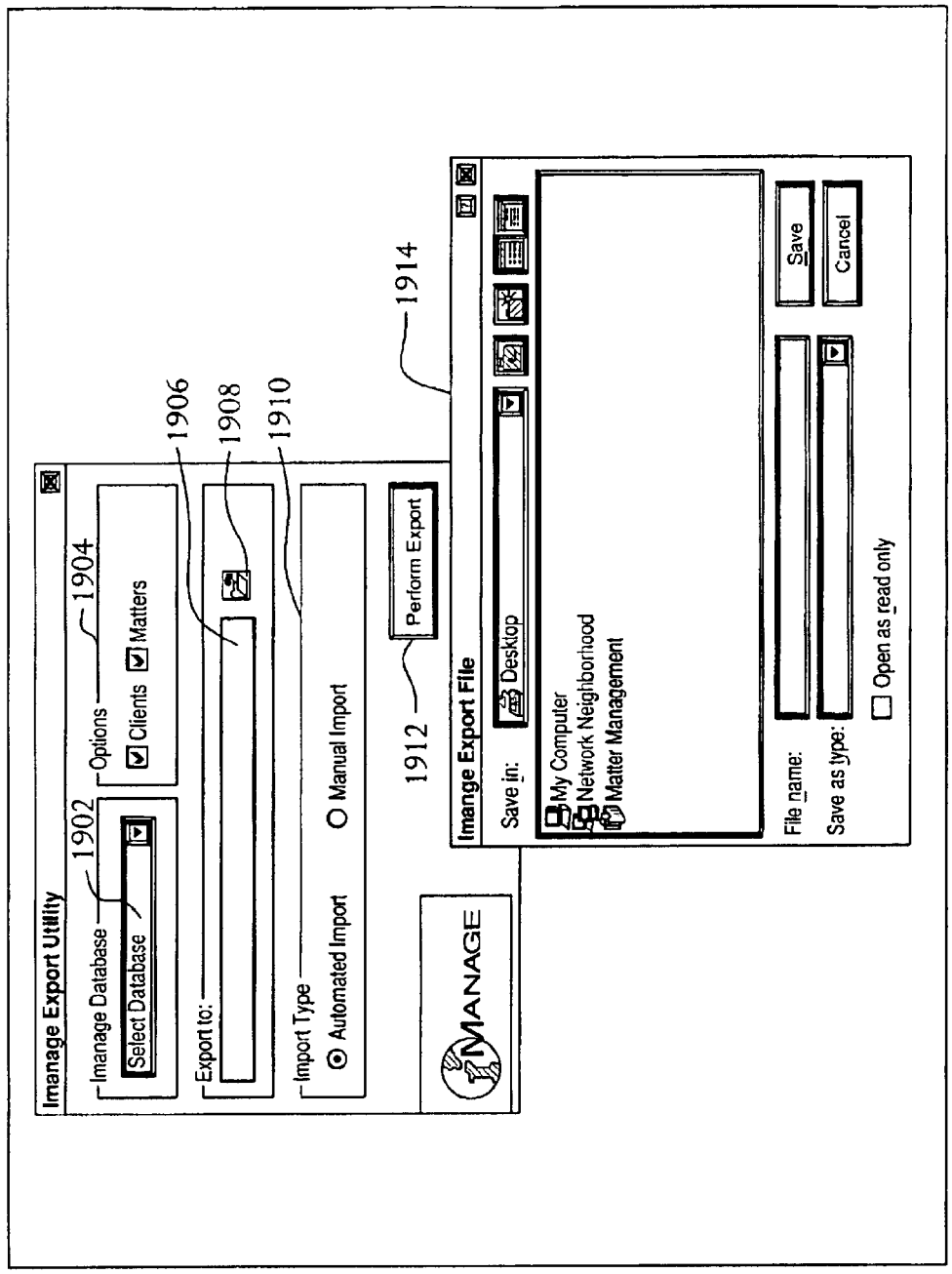
FIG. 21 is a screen shot of an aspect of the current invention.

The present invention may also allow for export a client/matter file to another, or a third party, application. The user can also import files, such as, ADO, ODBC reporting files, and other standard files, into the system. The method may also include a web interface, thereby allowing the user to connect into the system from remote locations. For example, the user may connect into a work computer through a home computer, thereby allowing the user to work from home. FIG. 21 illustrates an embodiment of the present invention that allows the user to select a database 1902, and client matter options 1904, and the destination of the export 1906. Alternatively, selection of a file 1908 may generate an export file pop-up window 1914. Import/export may be automated or manual 1910, for example. Once the destination for export/import has been selected, export may be performed by depressing the perform export button 1912, for example.

Those of ordinary skill in the art will recognize that many modifications and variations of the present invention may be implemented. Although the invention has been described and pictured in a preferred form with a certain degree of particularity, it is understood that the present disclosure of the preferred form has been made by way of example, and that numerous changes in the details of construction and combination and arrangement of parts and steps may be made without departing from the spirit and scope of the invention as is hereinafter claimed.

What is claimed is:

1. A computer program product embodied on one or more computer-readable storage mediums and for enabling manipulation of data of differing types, said data being stored in at least one data store and having a predetermined inter-relationship, the computer program product comprising:
    code for cooperating with at least one user interface to receive user input associated with said stored data;
    code for automatically interacting with said at least one data store dependently upon said received user input to enable manipulation of a portion of said stored data of a given data type;
    code for automatically identifying at least one other portion of said stored data of a data type distinct from said first data type and having a given relationship with said portion of data; and,
    code for automatically triggering a predetermined manipulation of said at least one other portion of said stored data dependently upon and associated with said received input;
    wherein said at least one user interface is a graphical user interface; and
    wherein said graphical user interface displays information organized as general information, expense information, personnel information, and documents.

2. The computer program product of claim 1, wherein said graphical user interface is implemented for a legal office application.

3. The computer program product of claim 1, wherein said general information comprises a client name and number, a matter name and number, a matter description, and a matter category.

4. The computer program product of claim 1, wherein said expense information comprises invoice date, number, amount, and billing entity, itemized billing description, amount of itemized billing and status of said invoice; wherein a user may perform operations on said invoice by selecting one from the group consisting of pay invoice, edit invoice, and delete invoice functions.

5. The computer program product of claim 1, wherein said personnel information comprises company name, individual person name, role of individual in matter and hosting company.

6. A computer program product embodied on one or more computer-readable storage mediums and for enabling manipulation of data of differing types, said data being stored in at least one data store and having a predetermined inter-relationship, the computer program product comprising:
    code for cooperating with at least one user interface to receive user input associated with said stored data;
    code for automatically interacting with said at least one data store dependently upon said received user input to enable manipulation of a portion of said stored data of a given data type;
    code for automatically identifying at least one other portion of said stored data of a data type distinct from said first data type and having a given relationship with said portion of data; and,
    code for automatically triggering a predetermined manipulation of said at least one other portion of said stored data dependently upon and associated with said received input;
    wherein said given relationship is one or more of the group consisting of association by client, association by matter, and association by category.

7. The computer program product of claim 6, wherein said matter is an activity associated with said client.

8. The computer program product of claim 6, wherein said category is one or more of the group consisting of general representation, intellectual property, labor and employment, license agreements, litigation, policies, potential claims, real estate and leasing, securities, supply agreements, and taxes.

9. A computer program product embodied on one or more computer-readable storage mediums and for enabling manipulation of data of differing types, said data being stored in at least one data store and having a predetermined inter-relationship, the computer program product comprising:
    code for cooperating with at least one user interface to receive user input associated with said stored data;
    code for automatically interacting with said at least one data store dependently upon said received user input to enable manipulation of a portion of said stored data of a given data type;

code for automatically identifying at least one other portion of said stored data of a data type distinct from said first data type and having a given relationship with said portion of data; and, wherein said data types comprises a word processor data type, a calendar and scheduler data type, a spreadsheet data type, an accounting data type, and a personal contacts data type;

wherein said graphical user interface displays information organized as general information, expense information, personnel information, and documents; and wherein said expense information comprises invoice date, number, amount, and billing entity, itemized billing description, amount of itemized billing and status of said invoice; wherein said user may perform operations on said invoice by selecting one from the group consisting of pay invoice, edit invoice, and delete invoice functions.

10. The computer program product of claim 9, wherein said personnel information comprises company name, individual person name, role of individual in matter and hosting company.

11. The computer program product of claim 9, wherein said given relationship is one or more of the group consisting of association by client, association by matter, and association by category.

* * * * *